US010913315B1

(12) United States Patent
Del Olmo et al.

(10) Patent No.: US 10,913,315 B1
(45) Date of Patent: Feb. 9, 2021

(54) SELF CONTAINED TIRE INFLATOR

(71) Applicants: Richard William Del Olmo, Barrington, IL (US); Armand Joseph Gasbarro, New Lenox, IL (US); Randall Cary Kramer, Glenview, IL (US)

(72) Inventors: Richard William Del Olmo, Barrington, IL (US); Armand Joseph Gasbarro, New Lenox, IL (US); Randall Cary Kramer, Glenview, IL (US)

(73) Assignee: UNICUS INNOVATIONS LLC, Fox River Grove, IL (US)

( * ) Notice: Subject to any disclaimer, the term of this patent is extended or adjusted under 35 U.S.C. 154(b) by 0 days.

(21) Appl. No.: 15/929,636

(22) Filed: May 13, 2020

Related U.S. Application Data

(60) Provisional application No. 62/846,857, filed on May 13, 2019.

(51) Int. Cl.
| | |
|---|---|
| B60C 23/10 | (2006.01) |
| B60C 23/00 | (2006.01) |
| B60C 23/04 | (2006.01) |

(52) U.S. Cl.
CPC .......... *B60C 23/004* (2013.01); *B60C 23/041* (2013.01); *B60C 23/0447* (2013.01);
(Continued)

(58) Field of Classification Search
CPC ... B60C 23/10; B60C 23/004; B60C 23/0447; B60C 23/0486; B60C 23/0484; B60C 23/041
See application file for complete search history.

(56) References Cited

U.S. PATENT DOCUMENTS

| 4,067,376 A | 1/1978 | Barabino |
| 4,582,108 A | 4/1986 | Markow |
| (Continued) | | |

FOREIGN PATENT DOCUMENTS

WO   WO2001060644 A1   8/2001

OTHER PUBLICATIONS

WO2001060644A1 Bartels English language Machine Translation Aug. 23, 2001.

*Primary Examiner* — Scott A Browne
(74) *Attorney, Agent, or Firm* — Patents and Licensing LLC; Daniel W Juffernbruch

(57) ABSTRACT

An inflator disposed within a tubeless tire for inflating the tubeless tire. A rechargeable electric storage disposed within a tubeless for providing electricity. An electric air compressor is mounted on an inside surface of the rim of the tubeless tire within the pressure cavity of the tubeless tire. The electric air compressor and an air pressure sensor disposed within the tubeless tire runs by a controller. The electric air compressor has a compressed air inlet vented to atmosphere in a custom valve stem through a conventional hole of a valve stem in the rim of the tubeless tire. A motion activated power generator recharges the rechargeable electric storage. A short-range radio transmits measured pressure data for each tire to a central OBD module plugged into in the vehicle. The central OBD module connects through a smartphone indirectly or directly to a central server via a networked cellular radio tower.

64 Claims, 24 Drawing Sheets

(52) U.S. Cl.
CPC ...... *B60C 23/0484* (2013.01); *B60C 23/0486* (2013.01); *B60C 23/10* (2013.01)

(56) References Cited

U.S. PATENT DOCUMENTS

| | | | |
|---|---|---|---|
| 4,840,212 A | 6/1989 | Wei | |
| 5,018,795 A * | 5/1991 | Engerand | B29D 99/0032 152/410 |
| 5,152,579 A * | 10/1992 | Bishai | A47C 7/467 297/284.6 |
| 5,218,861 A | 6/1993 | Brown | |
| 5,325,902 A * | 7/1994 | Loewe | B60C 23/004 152/418 |
| 5,452,753 A | 9/1995 | Olney | |
| 5,541,574 A | 7/1996 | Lowe | |
| 5,556,489 A * | 9/1996 | Curlett | B60C 23/12 152/418 |
| 5,928,444 A * | 7/1999 | Loewe | B60C 23/004 152/418 |
| 5,960,844 A | 10/1999 | Hamaya | |
| 6,019,149 A * | 2/2000 | Stringer | B60B 21/12 152/381.5 |
| 6,067,850 A | 5/2000 | Lang | |
| 6,147,659 A | 11/2000 | Takahashi | |
| 6,161,494 A * | 12/2000 | Pontevolpe | B63B 59/02 114/219 |
| 6,291,901 B1 | 9/2001 | Cefo | |
| 6,470,933 B1 | 10/2002 | Volpi | |
| 6,474,380 B1 | 11/2002 | Rensel | |
| 6,581,449 B1 | 6/2003 | Brown | |
| 6,748,797 B2 | 6/2004 | Breed | |
| 7,075,421 B1 | 7/2006 | Tuttle | |
| 7,096,727 B2 | 8/2006 | Adamson | |
| 7,138,911 B2 | 11/2006 | Tyndall | |
| 7,183,937 B2 | 2/2007 | Park | |
| 7,260,984 B2 | 8/2007 | Roundy | |
| 7,363,806 B2 | 4/2008 | Huang et al. | |
| 7,322,392 B2 | 6/2008 | Hawes | |
| 7,423,350 B2 | 9/2008 | Hattori | |
| 7,467,034 B2 | 12/2008 | Breed | |
| 7,719,406 B2 | 6/2010 | Bajahr | |
| 7,748,422 B2 | 7/2010 | Bol | |
| 8,204,645 B2 | 6/2012 | Weston | |
| 8,463,491 B2 | 6/2013 | Weston | |
| 8,479,791 B2 | 7/2013 | Schulte | |
| 8,498,785 B2 | 7/2013 | Juzswik | |
| 8,651,155 B2 | 2/2014 | Hinque | |
| 8,656,972 B2 | 2/2014 | Hinque | |
| 8,747,084 B2 | 6/2014 | Richardson | |
| 8,763,661 B2 | 7/2014 | Richardson | |
| 9,039,392 B2 | 5/2015 | Richardson | |
| 9,074,595 B2 | 7/2015 | Richardson | |
| 9,121,401 B2 | 9/2015 | Richardson | |
| 9,145,887 B2 | 9/2015 | Richardson | |
| 9,199,516 B2 | 12/2015 | Jansen | |
| 9,222,473 B2 | 12/2015 | Richardson | |
| 9,278,590 B2 | 3/2016 | Friel | |
| 9,302,594 B2 | 4/2016 | Tripathi | |
| 9,327,562 B2 | 5/2016 | Lin | |
| 9,604,157 B2 | 3/2017 | Richardson | |
| 10,046,608 B2 | 8/2018 | Haas | |
| 10,124,632 B2 | 11/2018 | Tsujita | |
| 10,144,254 B2 * | 12/2018 | Richardson | F03G 7/08 |
| 10,457,103 B2 | 10/2019 | Liu | |
| 2004/0007302 A1 * | 1/2004 | Hamilton | B60C 23/12 152/416 |
| 2007/0024233 A1 * | 2/2007 | Ekchian | H04M 1/0202 320/101 |
| 2007/0222570 A1 | 9/2007 | Ou | |
| 2009/0107602 A1 | 4/2009 | Kabakov | |
| 2009/0151441 A1 | 6/2009 | Yim | |
| 2012/0211997 A1 | 8/2012 | Bonisoli | |
| 2012/0234447 A1 * | 9/2012 | Narloch | B60C 23/004 152/418 |
| 2013/0278406 A1 * | 10/2013 | Weston | B60C 23/0488 340/442 |
| 2014/0023518 A1 * | 1/2014 | O'Brien | B60S 5/046 417/1 |
| 2015/0202930 A1 | 7/2015 | Jang | |
| 2015/0367693 A1 * | 12/2015 | Richardson | F04B 17/00 152/418 |
| 2015/0375576 A1 * | 12/2015 | Holsapple | B60C 23/002 152/416 |
| 2016/0121666 A1 | 5/2016 | Chan | |
| 2017/0039890 A1 | 2/2017 | Truong | |
| 2017/0144496 A1 | 5/2017 | Dudar | |
| 2018/0096542 A1 | 4/2018 | Mader | |

* cited by examiner

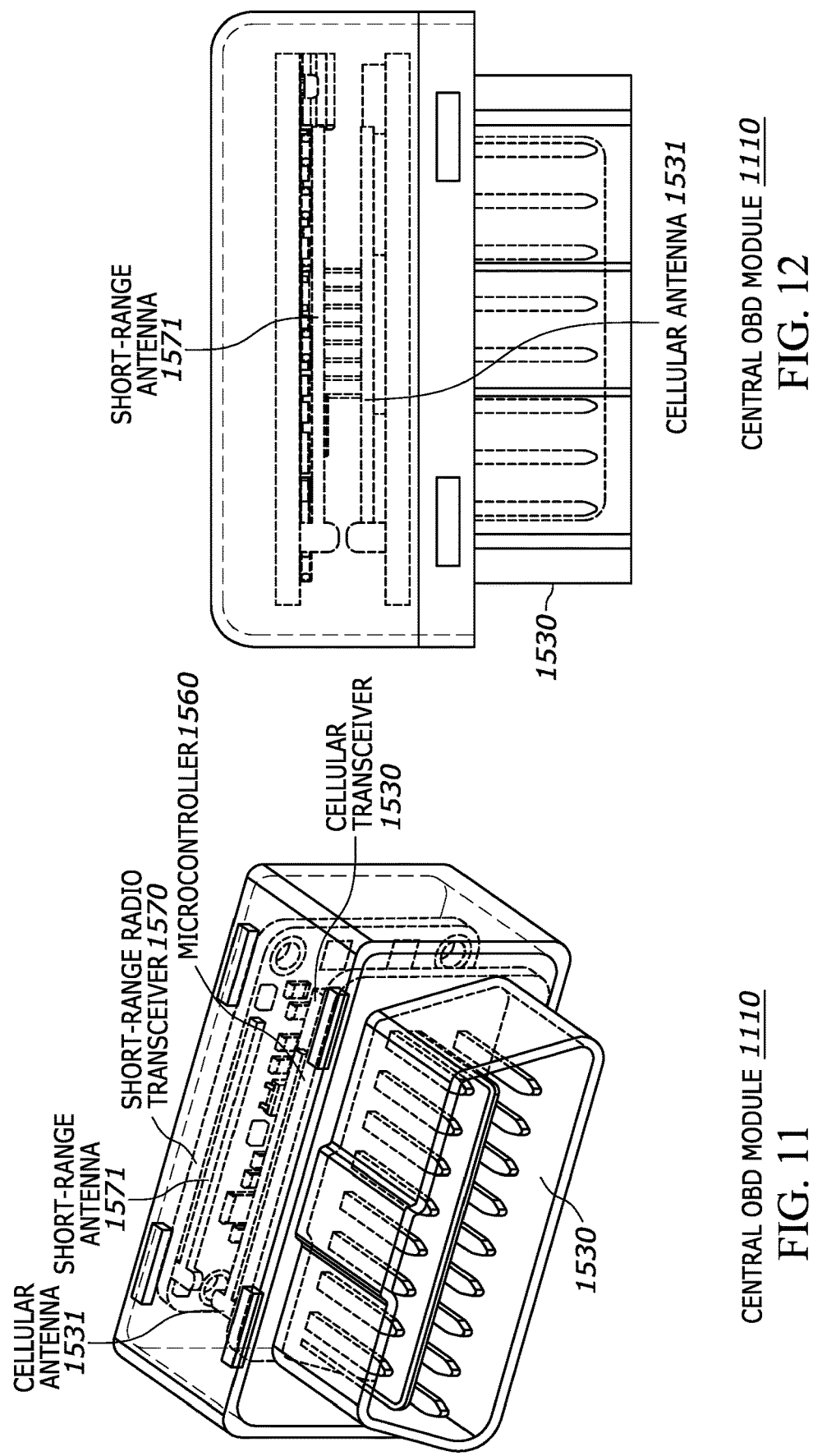

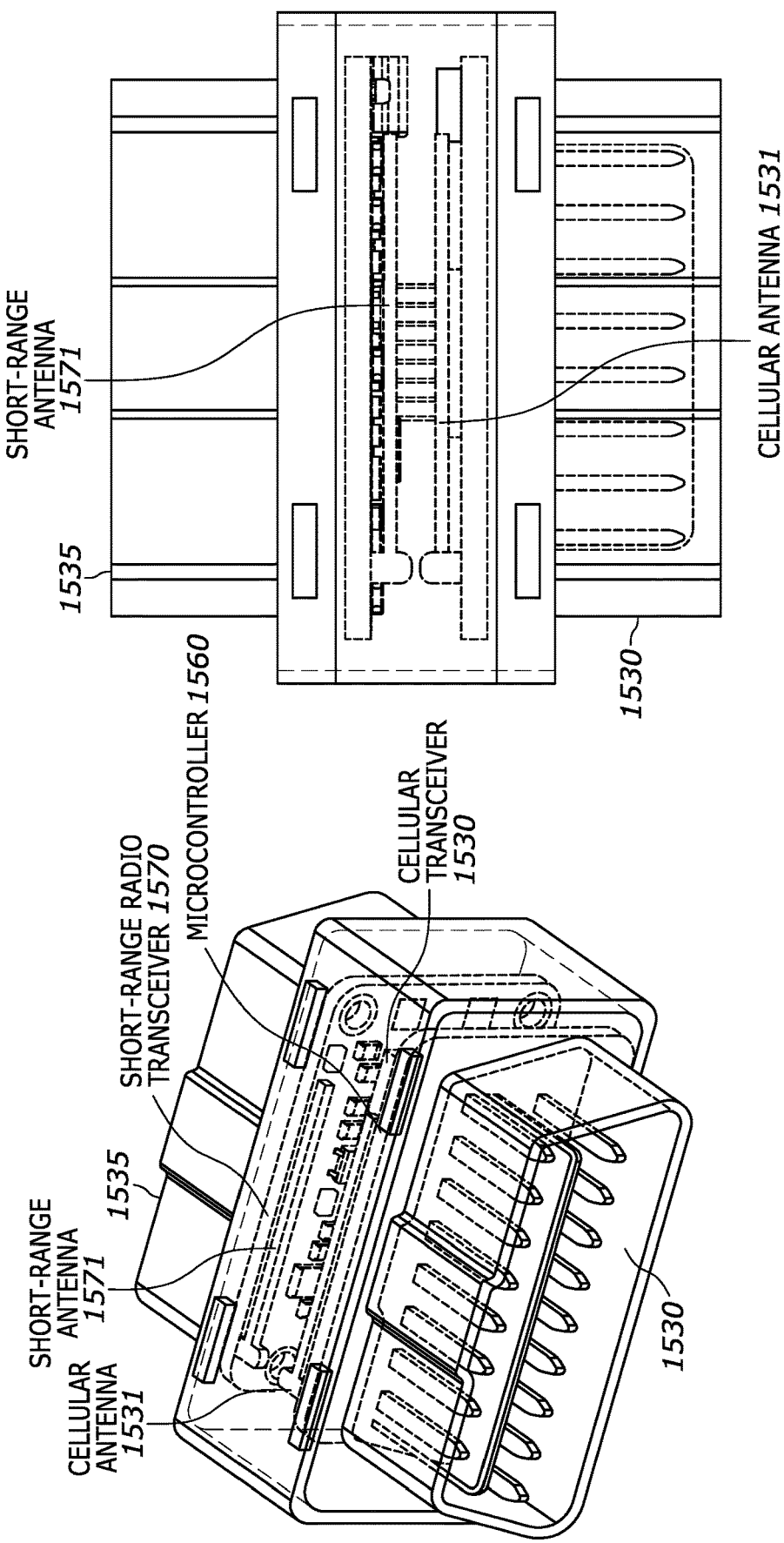

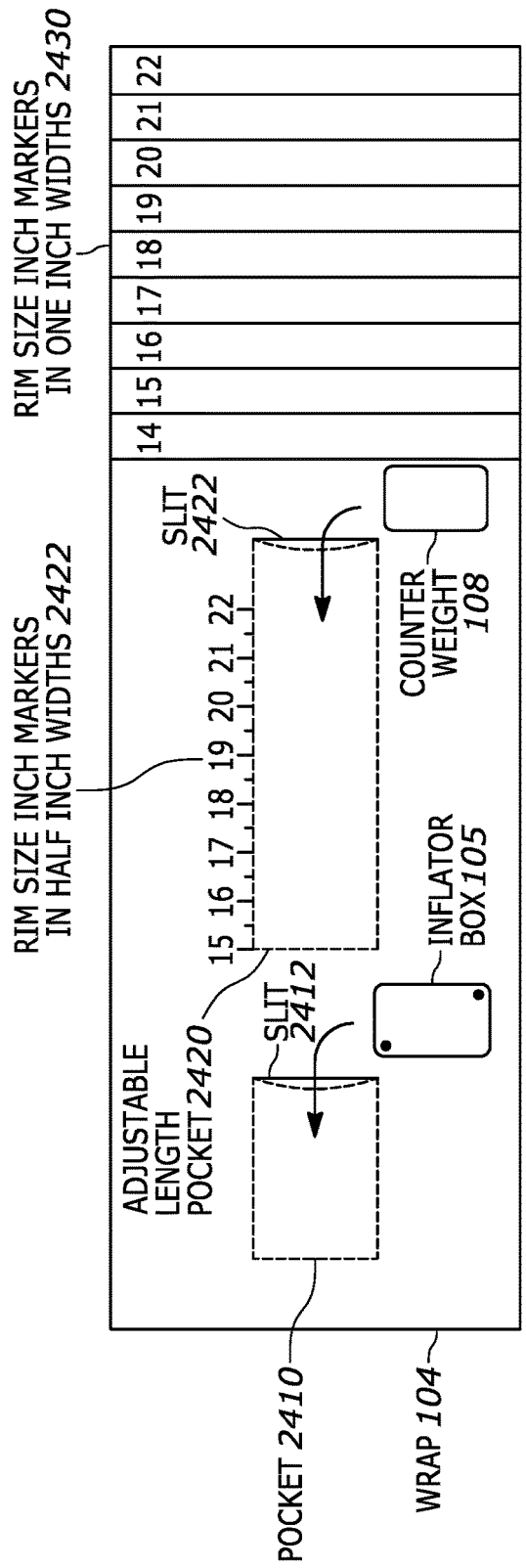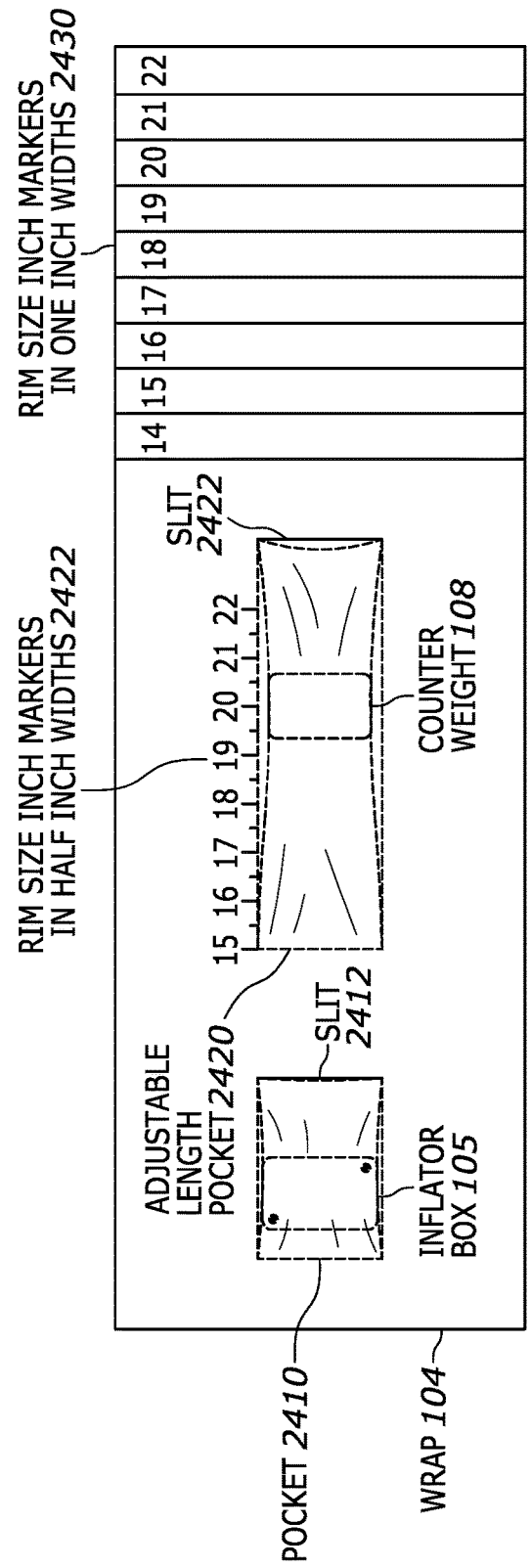

SELF CONTAINED TIRE INFLATOR

CROSS-REFERENCE TO RELATED APPLICATIONS

This application claims priority benefits under 35 U.S.C. §§ 119(e) and 120 to U.S. provisional application No. 62/846,857 filed on May 13, 2019. Such provisional application is incorporated herein by reference as if set forth in full herein.

BACKGROUND OF THE INVENTIONS

1. Technical Field

The present inventions relate to tire accessories and, more particularly, relate to automated regulation and adjustment of air pressure in a tire.

2. Description of the Related Art

The Halo by Aperia Technologies is a circular device that is retrofitted to fit on the outside rims of wheels on semi-truck tractor trailers. This Halo is completely mechanical. From the factory, each Halo is specially built for each tractor trailer. Each Halo is custom fit to a PSI and is not able to be changed, once configured and left from the factory. The minimum PSI on a Halo is 80 psi, not suitable for passenger vehicles. In order to purchase and order Halo, one must have a trucking license. The Halo uses mechanical components as mentioned. Centripetal force is used with a weighted bar that sits at the bottom. As the wheel rotates, the weighted bar pushes air to the outside air pocket which stores the air. A mechanically controlled valve allows the pressure, if greater than the preset pressure, to be released via a pressure valve to a pressure level that is set from the factory.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIGS. 11 and 12 illustrate perspective views of the central OBD module with a single connector according to one embodiment of the present inventions;

FIGS. 13 and 14 illustrate perspective views of the central OBD module with dual connectors according to another embodiment of the present inventions;

FIG. 24 illustrates a plan view of an alternate wrap in a first step for the installation on the rim according the embodiments of the present inventions;

FIG. 25 illustrates a plan view of the alternate wrap in a second step for the installation on the rim according the embodiments of the present inventions;

DETAILED DESCRIPTION OF THE PREFERRED EMBODIMENTS

Figure 1:
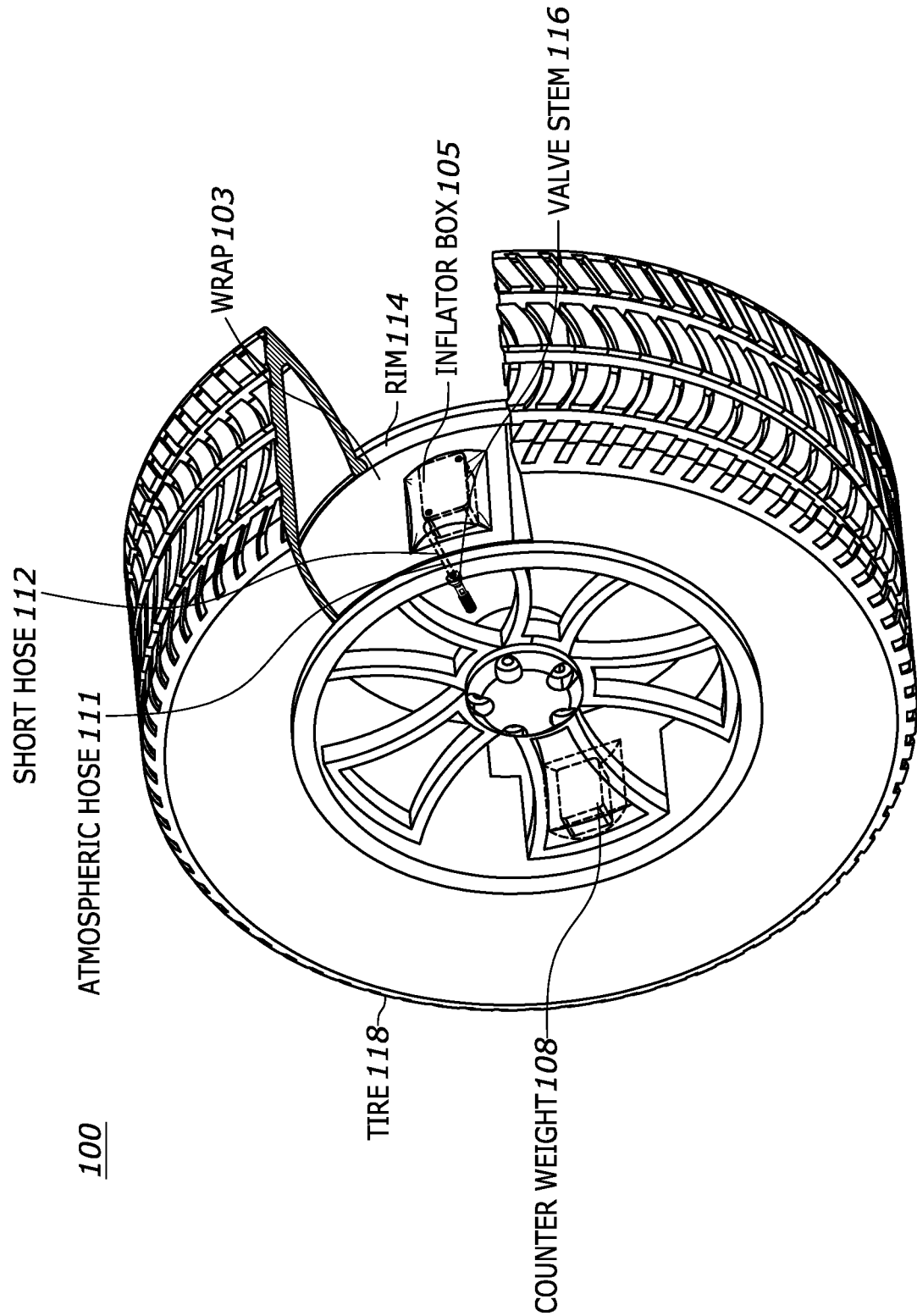
FIG. 1 illustrates a perspective view of a tire and rim with the inflator box according to embodiments of the present inventions.

FIG. 1 illustrates a perspective view of a tire 118 and rim 114 with the inflator box 105 according to embodiments of the present inventions. The inflator box 105 and a counter weight 108 is held against an outer circumferential surface of the rim 114 by a wrap 103. The wrap 103 holds the counter weight 107 and the inflator box in positions opposite one another. The inflator box 105 couples to an atmospheric channel in a valve stem 116 by an atmospheric hose 111. An electric air pump located inside of the inflator box 114 draws air through the atmospheric hose 111 and valve stem 116 and out of the short hose 112 into an air cavity of the tire.

The valve stem 116 is a custom valve stem that can replace a conventional OEM valve stem and can be installed as an aftermarket improvement along with the inflator box 105. The inflator box 114 has its own pressure monitor and can co-exist separately from an original equipment manufacturer (OEM) tire pressure monitoring system (TPMS). The inflator box can alternately be installed in factory on each rim inside each tire cavity and provide essential tire pressure monitoring and adjustment with its electric air compressor.

The concept of inflator box begins with being sightless to the human eye when looking at an individual tire. The concept here is that there will be an inflator box component polar opposite to the electrical box which essentially is the power supply and battery pack; these two major components are bound together with adjustable wraps. The battery will be located within the inflator box and will be used as emergency backup if supercapacitor runs out or fails.

The concept is that everything will happen inside the tire, where the consumer will not be able to tell the device is on their vehicle. The inflator box includes the TPMS sensor inside to dictate how much air is inside the tire. There is also a circuit board inside the inflator box as well. This is the microcontroller and processor for the entire operation. The microcontroller will be housed within the inflator Box. The microcontroller is responsible for all of the actions that the inflator box controls such as: measuring pressure, sending and receiving signals to mechanical components and communicating information to the user's inflator app. When the tire pressure is low which is sensed by the TPMS sensor, the circuit board will instruct to draw battery power from the battery supply. The battery supply can act as a counterweight and be positioned on the rim polar opposite from the inflator box. There will be a set standard set upon installation for each tire. For example, if the set PSI is 36 and the TPMS sensor inside the inflator box senses the pressure is low by at least 3 PSI, the circuit board will dictate to draw power from the power supply to kick on the compressor that is inside the inflator box, which is polar opposite inside the tire. The inflator box includes the compressor, which pumps air inside the tire. A key component to this operation is our own custom valve stem. The custom valve stem will act for air to inflate the tire and also deflate the tire when the set pressure exceeds not less or greater than 3 PSI of an OEM manufacturer's recommended tire pressure. This valve stem acts as an inlet and also an outlet for air to pass through. When the compressor needs to pump air into the tire, it draws air from the outside through our custom valve stem. Our custom valve stem will have the standard design as normal valve stems do; our custom stem will also have a small slit on the side of the valve stem that acts as the inlet/outlet for air. The valve stem flap will open up allowing air to be sucked into the tire. On the contrary, if the valve stem senses too much pressure into the tire, the flap will also open up and release the necessary amount of air needed to satisfy the PSI requirement of the tire.

This inflator can maintain OEM standard tire pressures on automobiles with rim sizes 14" to 22" through the usage of Bluetooth or WiFi and Bluetooth. The inflator box will fill and release air from automobile tires through the process of Bluetooth or WiFi and Bluetooth, in real time, to that automobile's specified OEM Standards. The inflator box operates without the customer of the automobile having to visit an automotive repair facility, check the tire pressure nor have to fill up the tires manually. However, the customer will be able to fill the tire manually if so desired. The inflator box will be hidden from the human eye and is not in visible sight. FIG. 1, the inflator box utilizes and takes advantage of the inside of the tire, while being attached to the rim itself. Visualize a rim with no tire on it. On the outer circumference portion of the rim itself, is where the inflator box will be secured onto the rim.

Figure 2:
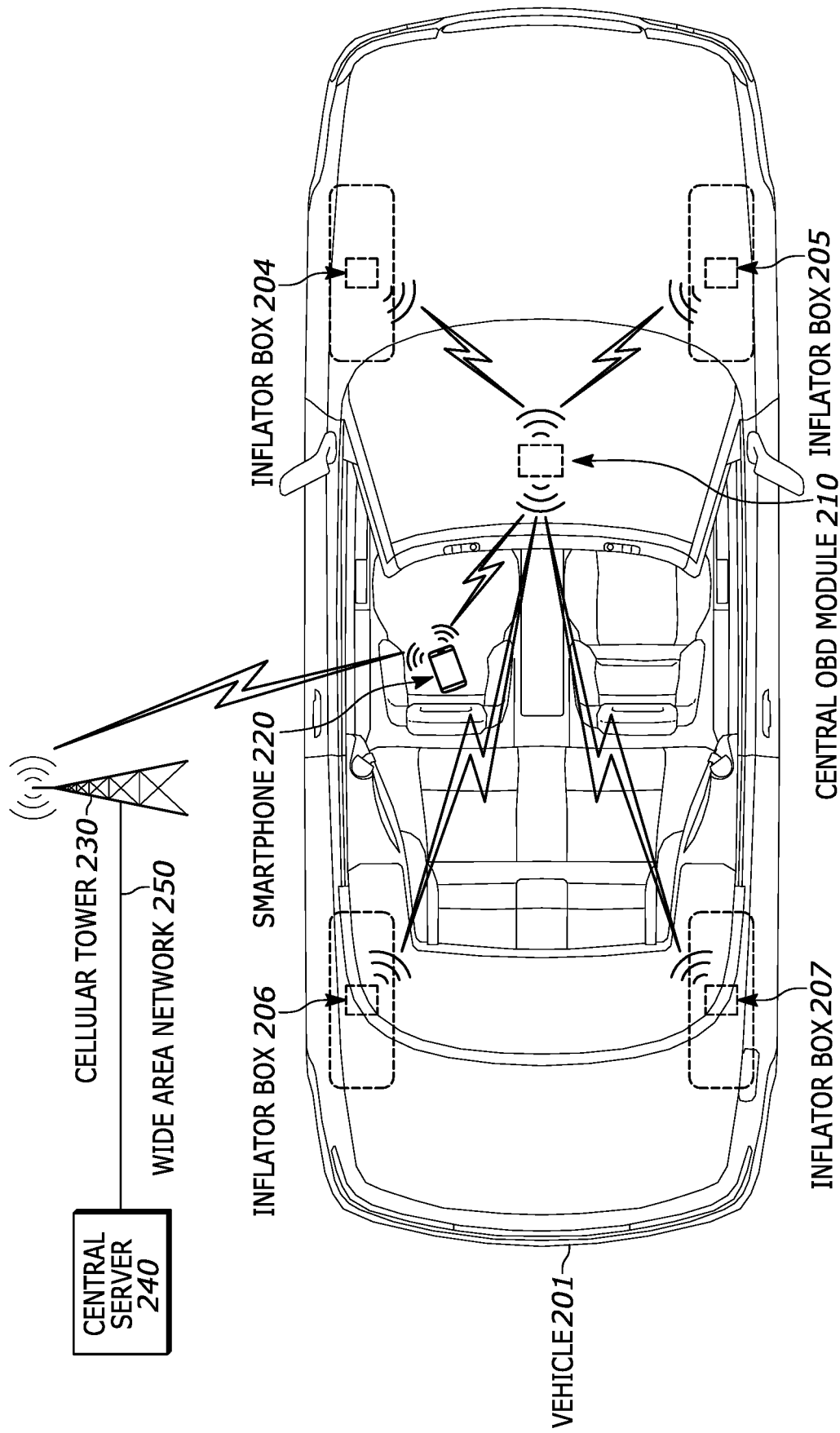
FIG. 2 illustrates a top view of a vehicle with four inflator boxes mounted on rims in each tire and a central on-board diagnostics (OBD) module and a smartphone connected to a cellular tower and a networked central server according to embodiments of the present inventions.

FIG. 2 illustrates a top view of a vehicle 201 with four inflator boxes 204, 205, 206, 207 mounted on rims in each tire and a central on-board diagnostics (OBD) module 210 and a smartphone 220 connected to a cellular tower 230 and a central server 240 over a wide area network 250 according to embodiments of the present inventions. In the embodiment of FIG. 2, the smartphone 220 ax as a relay for communications between the central OBD module 210 and the cellular tower 230. This reduces the cost of cellular radio hardware and a cellular telephone subscription with the carrier for the for a central OBD module 210. The smartphone 220 couples with the central OBD module 210 via Bluetooth for purposes of communication with a cellular tower 230 via this relay and also for purposes of monitoring tire status information. The inflator boxes 204, 205, 206, 207, send tire status information over Bluetooth to the central OBD module 210. The tire status information sent by each of the inflator boxes 204, 205, 206, 207 to the central OBD module 210 can include the tire ID, the tire pressure, the tire temperature, tire acceleration history data, tire air compressor operation history data, and tire battery/supercapacitor charge status. The central OBD module 210 then sends at least some of this tire status information to the smartphone 220. The smartphone 220 displays at least some of this tire status information to the driver. When the smartphone 220 is disconnected from Bluetooth, the central OBD module 210 stores tire status information received from the inflator boxes 204, 205, 206, 207. Then when the smartphone 220 connects via Bluetooth to the central OBD module 210, the stored status and for tire status information is displayed on a touchscreen of the smartphone 220. The smartphone 220 can also connect to some vehicles via wireless connection such as near field communication (NFE) or Bluetooth and display the tire status information on a dashboard phone display or other dashboard display of the vehicle.

Alternative communication protocols besides Bluetooth can be used between the inflator boxes 204, 205, 206, 207 and the central OBD module 210. Besides conventional Bluetooth, Bluetooth low energy (BLE) and other types of communications such as WiFi etc. can be used. Similarly the smartphone 220 can connect the central OBD module using other types of protocols besides Bluetooth such as Bluetooth BLE or NFC etc.

The central server 240 has a processor that receives over a network adaptor via the wide area network a vehicle ID or central OBD module ID and stores it in a memory of the central server. The central server 240 can also receive each individual tire ID from each of the inflator boxes 204, 205, 206, 207 and store it in the memory of the central server. The central server 240 processor can monitor the statuses in memory compared against predetermined thresholds for each vehicle or tire or vehicle and prepare alerts when the thresholds are exceeded. The central server 240 can have an email server or a text messaging module to then send emergency alerts by text message or email over the wide area network 250 to the smartphone 220 or an app on the smartphone when an emergency conditions or tire maintenance are required. That way if the smartphone 220 is not coupled by Bluetooth to the central OBD module 210, the driver can still timely receive alerts.

Figure 3:
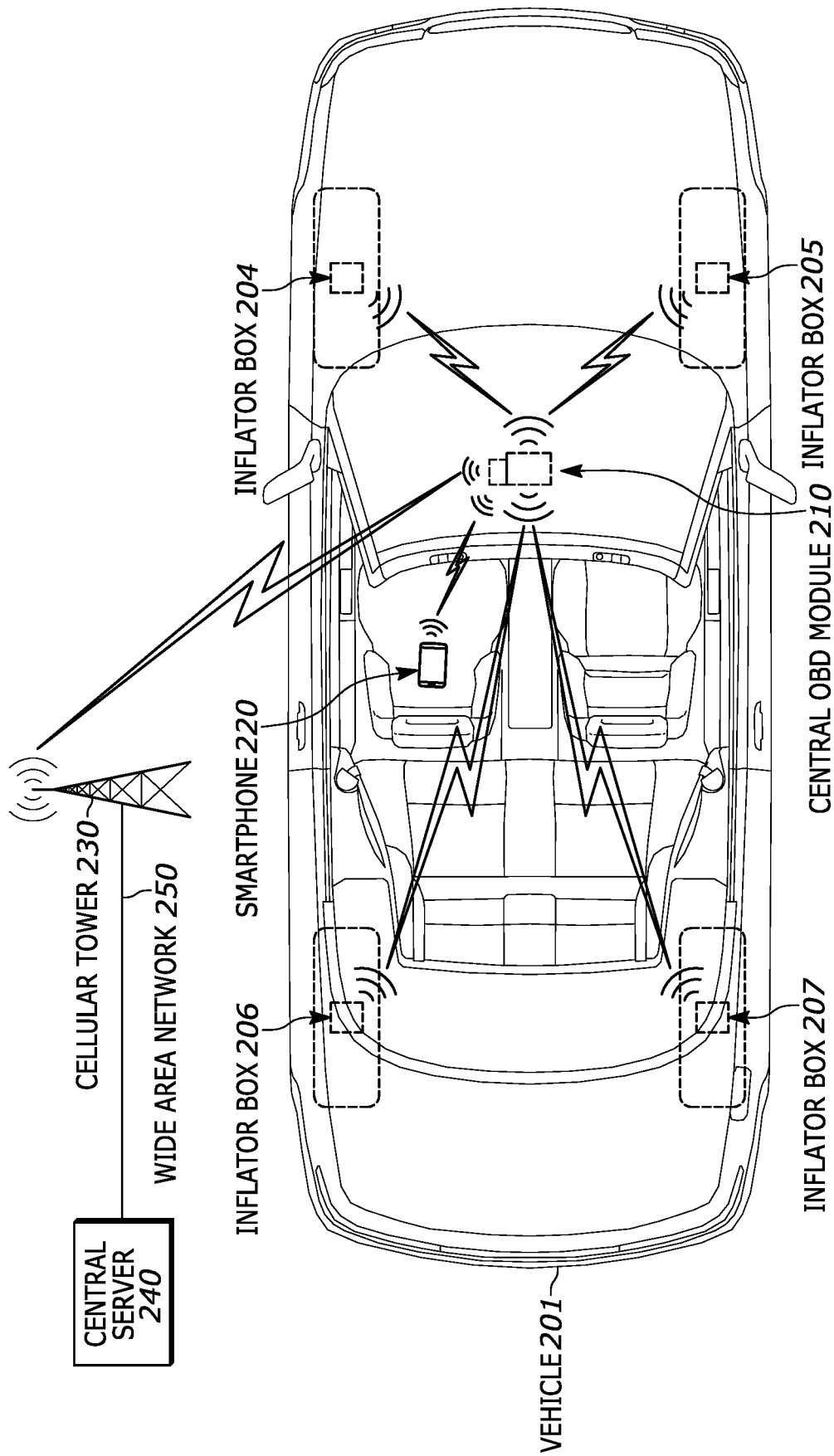
FIG. 3 illustrates a top view of a vehicle with four inflator boxes mounted on rims in each tire and a smartphone and a central OBD module connected to a cellular tower and a networked central server according to embodiments of the present inventions.

FIG. 3 illustrates a top view of a vehicle 201 with four inflator boxes 204, 205, 206, 207 mounted on rims in each tire and a smartphone 220 and a central OBD module 210 connected to a cellular tower 230 and a central server 240 over a wide area network 250 according to embodiments of the present inventions. In the alternative embodiment of FIG. 3, the central OBD module 210 talks directly with the cellular tower 230. This alternative embodiment requires a cellular radio hardware and cellular telephone subscription with the carrier. The smartphone 220 still couples with the central OBD module 210 via Bluetooth for purposes of monitoring tire status information. The wireless connections in the embodiment of FIG. 2 can be the same as in the embodiment of FIG. 3 except the wireless connection between the central OBD module 210 and the cellular tower 230 can be conventional 3G or 4G or an Internet of Things or 5G type cellular radio connection.

Figure 4:
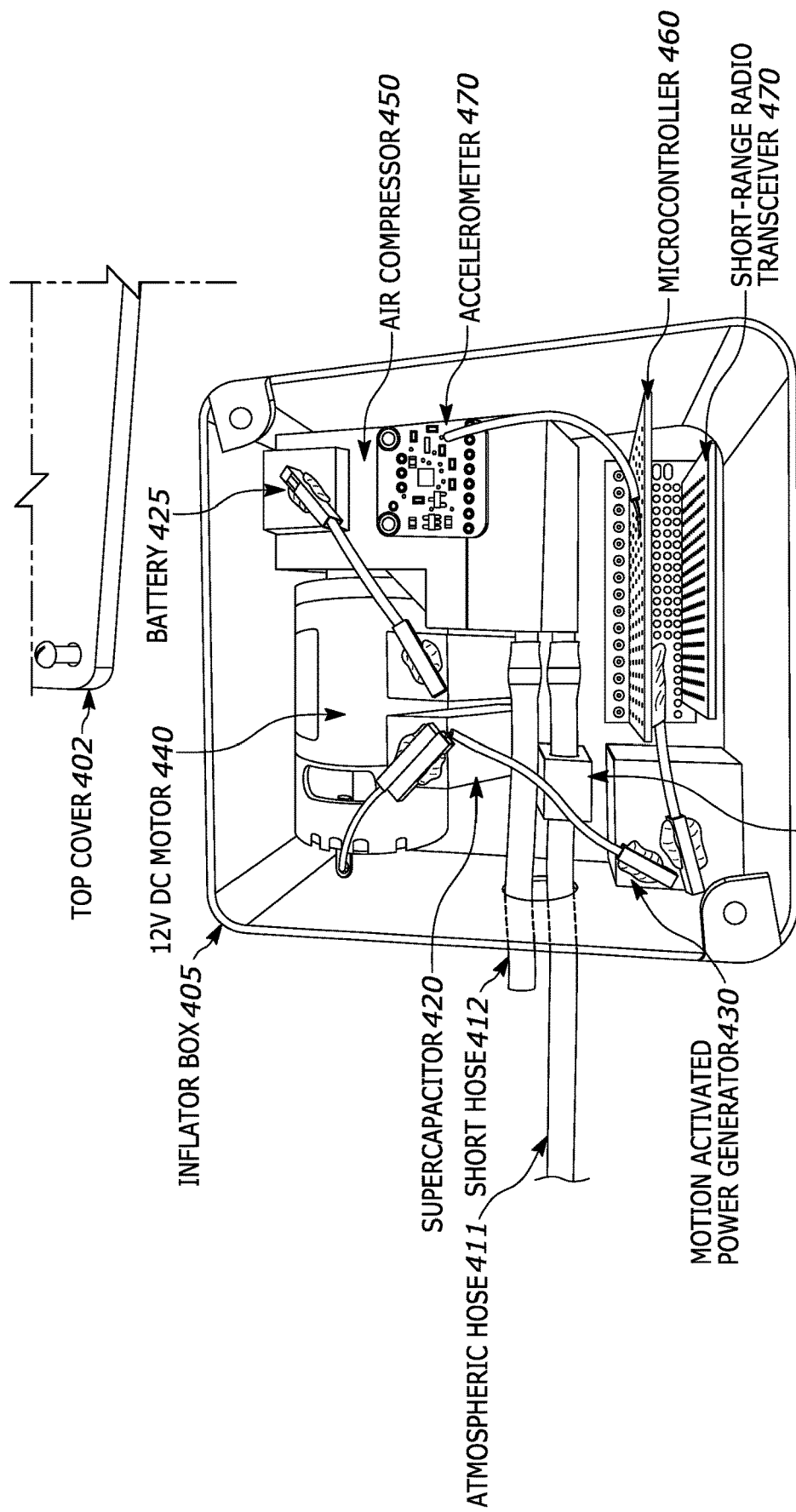
FIG. 4 illustrates a top view of the inside of an inflator box with a top cover removed according to embodiments of the present inventions.

FIG. 4 illustrates a top view of the inside of an inflator box 405 with a top cover 402 removed according to embodiments of the present inventions. A supercapacitor 420 and a battery 425 provide power for operation of the inflator box 405. A motion activated power generator 430 provides power to charge the supercapacitor 420 and the battery 425. A motion activated power generator 430 generates DC power from internal kinetic weight or mechanism that moves as the tire stands on an axle of the vehicle. A diode rectifier and power converter and the motion activated power generator 430 convert this power to a DC level necessary for charging the supercapacitor 420 and the battery 425. The motion activated power generator 420 is commercially available as the Kinergizer from The Netherlands at Kinergizer.com. The motion activated power generator can alternately use a piezoelectric element that generates electricity when a member deflects or vibrates as a tire spins. The motion activated power generator an even further alternately use a wire coil of generally very roughly about 1000 or more turns of wire to generate the electricity when the tubeless tire spins using magnetic field of earth. The DC motor 440 is preferably a 12 V motor when the supercapacitor 420 and the battery 425 are 12 Volts. If the supercapacitor 420 and the battery 425 are not 12 Volts, a power converter can be used in between. It is contemplated that the supercapacitor 420 has a higher capacity than the battery 425 thus making the battery 425 a small capacity backup battery. In the other hand, the battery 425 can have a longer and larger storage capacity than the supercapacitor 420 depending on cost and performance requirements. The DC motor 440 powers an air compressor 450. The air compressor 450 preferably has a piston in the air compressor. The air compressor or pump 450 in normal operation pulls air in through an atmospheric hose 411 and pushes air out through a short hose 412. In normal operation the air compressor 450 the short hose 412 pushes air into a tire cavity between the tire and the rim to inflate the tire. The atmospheric long hose 411 connects through the rim of the tire to outside atmosphere. As will be seen in embodiments, this atmospheric long hose 411 preferably connects through replaceable custom valve stem in an existing valve stem opening in the rim. An inline air filter 413 can optionally filter air sucked into the air compressor 450 from outside the tire. The inline air filter 413 prevents road debris, dust, and grit from clogging the piston in the air compressor 450. A microcontroller 460 controls operation of the inflator box 405 by preferably using a relay to turn power on and off to the DC motor 440 and control operation of the air compressor 450. The microcontroller 460 is also powered by the supercapacitor 420 and the battery 425. A power converter may be required to convert the power from the supercapacitor 420 and the battery 425 for operation at the voltages required by the microcontroller 460. An accelerometer 470 connects to the microcontroller 460 for recording acceleration history data in memory of the microcontroller 460. A short-range radio transceiver 470 can wirelessly transmit tire status information to the central OBD module.

The inflator box will wirelessly add and decrease air from tires that fit 14" to 22" rims; while the car is operating. Within each individual tire, lies each individual inflator box. The inflator box will ensure that the PSI of all tires meet OEM specified PSI standards. The inflator box is a wireless air inflator box that will be installed on each rim of a customer's vehicle. When a customer's tire decreases in PSI from the specified OEM standards, the inflator box wirelessly, will release air into the tire until the PSI reaches the specified OEM standards. The inverse is also true. When a customer's tire increases in PSI from the specified OEM standards, by not more than 3 PSI, the inflator box will release air through the valve stem from the tire until the PSI reaches the specified OEM standards. The inflator box is powered by a rechargeable battery. A function of the central OBD module is that it will obtain the vehicle's diagnostic information, and relay that information to the mobile app. The OBD port can recognize whether there is a problem with the customer's vehicle and alert the customer from their smartphone app.

The central OBD module will be compatible to the OBD port located inside every vehicle. This central OBD module draws power and will gather and distribute information wirelessly around the perimeter of the vehicle. Another function of the central OBD module will allow transfer of 100% of the automotive diagnostics to the inflator app. The central OBD module microcontroller is the hub of the information flow. This component allows the central OBD module to operate and successfully send information to and from each inflator box; wirelessly. The central OBD module microcontroller transfers the information from the OBD port in each customer vehicle to the customer's inflator app.

The inflator box's major components are individually wrapped to the outer portion of each rim via adjustable wraps. The inflator box and the inflator box that are bound together onto the rim with two adjustable wraps. These two boxes lie exactly polar opposite from each other and have their own unique functions. Within the inflator box there exists the battery, the microcontroller, wireless communication capability and Bluetooth or WiFi charging capability through Transmitter Receivers. If the inflator box detects that the tire pressure is low, the inflator box will begin to engage its components by activating the inflator box's air compressor to inflate the tire to the pre-set manufacturer's specification for tire pressure. Once the pressure has reached the manufacturer's specification for tire pressure, the microcontroller will deactivate the inflator box to shut off. Conversely, if the tire pressure reaches 3 PSI above what is pre-set, the valve stem will release tire pressure down to the manufacturer's 5 tire pressure specification. The inflator box has no geographical limits due to its wireless design. The inflator box circuit board will have a sensor that monitors the PSI tire pressure. If the PSI tire pressure drops below 3 PSI tire pressure, the inflator box components will activate. Within the inflator Box, lies the compressor and single barrel piston. The circuit board detects the need for air in one or all four tires. Electricity from the battery is sent to the 12V compressor, which then turns the single barrel piston. The single barrel piston is the device that creates the air pressure, to be released within the tire. The single barrel piston when activated will move back and forth to create air pressure. Once the air pressure is generated, air will be released into the tire. Another function of the inflator box is to release air if the pressure exceeds standard specifications by 3 PSI via the valve stem. The valve stem is mechanically driven and the valve stem PSI is pre-set by the initial installer.

The inflator box may be manufactured from: (a) the outer shell material used by the NASA Lunar Module. More specifically, the Inflator Box is manufactured with stainless steel honeycomb between stainless steel sheets (stainless steel brazed honeycomb brazed between steel alloy face sheets), covered on the outside with ablative material; a heat-dissipating material. The inflator box can be filled with a layer of fibrous insulation for additional heat, vibration, compression protection and are chemically milled to reduce weight. It varies in thickness in inches from ⅛ inches to ¼ inches; and (b) the Inflator Box may at times be manufactured from Thermosets whom are extreme heat resistance polymers. Thermosets, are light-weight and have chemical-resistant properties. Thermosets offer high heat-resistance that makes the performance of Thermoset polymers exceptional.

Figure 5:
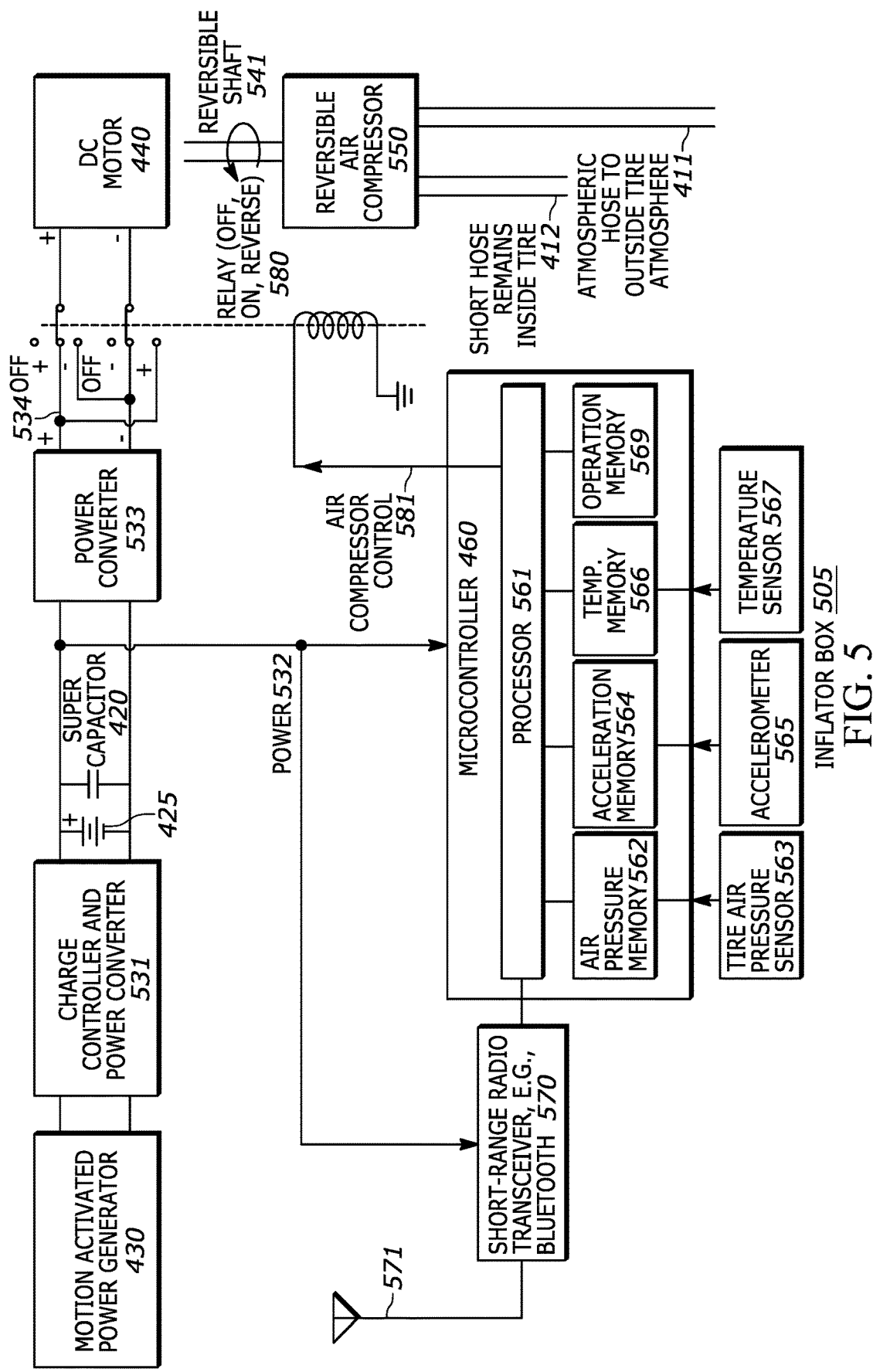
FIG. 5 illustrates a schematic block diagram of the inflator box with a reversible air compressor according to one embodiment of the present inventions.

FIG. 5 illustrates a schematic block diagram of the inflator box 505 with a reversible air compressor 550 according to one embodiment of the present inventions. The supercapacitor 420 and the battery 425 provide power to the DC motor 442 the air compressor 650 via the shaft reversible 541. The DC motor 440 is controlled by relay 580. The DC motor 440 is preferably a 12 V motor. If the voltage from the supercapacitor 420 and the battery 425 is not 12 V, a power converter 533 can be used for voltage conversion to output 534. A motion activated power generator 430 provides power to charge and recharge the supercapacitor 420 and the battery 425. A charge controller and power converter 531 is preferably used to convert the power from the motion activated power generator to the voltages needed to charge and recharge the supercapacitor for 20 and the battery 425. The charge controller and power converter 531 can also regulate the charge and ensure the battery 425 is not overcharged. The motion activated power generator 430 can have a diode rectifier or, alternatively, the charge controller and power converter 531 can contain the diode and rectifier to create DC from the AC generated in the motion at a power generator. The motion activated power generator 430 typically has an internal kinetic weight or mechanism that moves as the tire stands on an axle of the vehicle. The motion activated power generator 430 is commercially available as the Kinergizer from The Netherlands at Kinergizer.com.

A microcontroller 460 contains a processor 564 controlling the relay 580 by the air compressor control signal 581. In the embodiment of FIG. 5, the DC motor 440 has a dual forward or reverse state. An air control signal 581 from the processor 560 of the microcontroller 460 determines whether the air compressor 550 operates provides air in a forward or reverse direction by the direction of the reversible shaft 541 from the DC motor 440. The polarity of the DC current into the DC motor determines direction as switched by the relay 580. An atmospheric hose 411 leads to the outside tire atmosphere. A short hose 412 remains inside the tire. In normal operation, the reversible air compressor 550 pulls air from atmosphere through the atmospheric long hose 411 and pushes air through the short hose 412 into the tire to fill the tire with air and increase pressure of the tire. In the event the tire has too great a pressure, the processor 561 sends the air control signal 581 to the relay to reverse the polarity and thus the direction of the DC motor 440 and the shaft reversible 541. In this reverse direction, air is pulled through the short hose 412 by the air compressor 550 and pushed into the atmosphere on the outside of the tire by the atmospheric hose 412. The processor 560 decides which way the air pressure control signal 581 commands the relay 580 based on at least the parameters stored in the air pressure memory 562.

The processor 560 also uses an operation memory 569. The operation memory 569 contains software commands and/or firmware and scratchpad memory and RAM for the processor 560. An air pressure sensor 563 is located inside the volume of the tire and measures the air pressure of the tire. The microcontroller 460 connects to the air pressure sensor 563 to receive the measurement from the air pressure sensor 563. Also located inside on the tire or on the rim of the tire is an accelerometer 565 for measuring acceleration and a temperature sensor 567 for detecting temperature. The microcontroller 460 connects to the accelerometer 565 and the temperature sensor 567 to respectively receive and store measured acceleration data into the acceleration memory 564 and measured temperature data into the temperature memory 566. The processor 560 of the microcontroller 460 can use the temperature in temperature memory 566 to compensate the air pressure received an air pressure memory 562. Additionally the processor 560 of the microcontroller 460 can determine if there is a fault in the tire by an over temperature condition. The value of the temperature and in the temperature memory 566 can be compared by the processor 562 against a predetermined over temperature threshold. When the temperature in the temperature memory is above the predetermined over temperature threshold, the processor 560 of the microcontroller 460 can send an alert to a short-range radio transceiver 570 over the antenna 571. Power 532 is delivered to the short-range radio transceiver 570 and the microcontroller 460 by the supercapacitor 420 and the battery 425. The power 532 can alternately come from a power converter such as the power converter 533. The acceleration data in the acceleration memory 564 is sent by the processor 560 of the microcontroller 460 over the short-range radio transceiver 570 and the antenna 571 to the central ODB module for calculation of learned tire location, say after installation or rotation of new tires. The processor 560 of the microcontroller 460 can measures a power level of the battery 425 and the supercapacitor 420 and transmit the power level over the short-range radio 570. The short-range radio transceiver 570 is typically a Bluetooth transceiver or other transceiver such as Bluetooth BLE or WiFi. The short-range radio transceiver 570 is certain alternative embodiments need to only be a transmitter if the inflator box does not need to receive commands, though Bluetooth requires a transceiver capability for at least pairing. Additionally, the processor 560 of the microcontroller 460 sends air pressure measurements from the air pressure memory 562 over the short-range radio transceiver 570 and the antenna 571. These values sent over the short-range radio transceiver are picked up by the central ODB module for reporting to a user or the central server.

The processor 561 of the microcontroller 460 uses acceleration memory 564 and a timer for storing acceleration measurements and learning when the tire is apt to remain stationary, thereby operating the air compressor only when parked or at night. The processor 561 operates the air compressor only when the tire is apt to remain stationary if the measured air pressure is below a pressure threshold by a first deficiency and operates the air compressor regardless if apt to remain stationary if the measured air pressure is below the pressure threshold by a second deficiency, the second deficiency being larger than the first deficiency.

Figure 6:
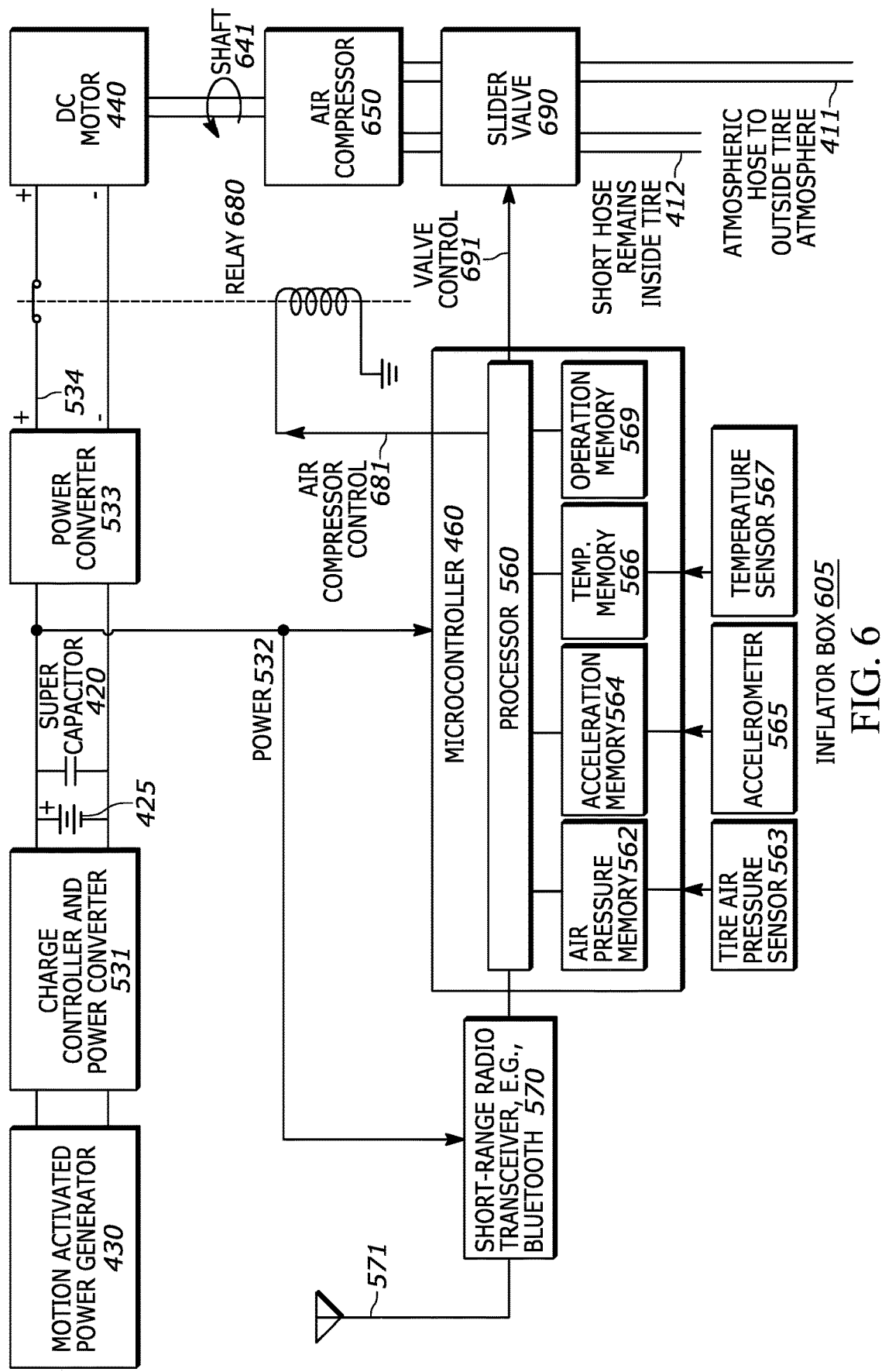
FIG. 6 illustrates a schematic block diagram of the inflator box with a valve coupled to the air compressor according to another embodiment of the present inventions.

FIG. 6 illustrates a schematic block diagram of the inflator box 605 with a valve coupled to an air compressor 650 according to another embodiment of the present inventions. The supercapacitor 420 and the battery 425 provide power to the DC motor 442 the air compressor 650 via the shaft 641. The DC motor 440 is controlled by relay 680. The DC motor 440 is preferably a 12 V motor. If the voltage from the supercapacitor 420 and the battery 425 is not 12 V, a power converter 533 can be used for voltage conversion to output 534. A motion activated power generator 430 provides power to charge and recharge the supercapacitor 420 and the battery 425. A charge controller and power converter 531 is preferably used to convert the power from the motion activated power generator to the voltages needed to charge and recharge the supercapacitor for 20 and the battery 425. The charge controller and power converter 531 can also regulate the charge and ensure the battery 425 is not overcharged. The motion activated power generator 430 can have a diode rectifier or, alternatively, the charge controller and power converter 531 can contain the diode and rectifier to create DC from the AC generated in the motion at a power generator. The motion activated power generator 430 typically has an internal kinetic weight or mechanism that moves as the tire stands on an axle of the vehicle. The motion activated power generator 430 is commercially available as the Kinergizer from The Netherlands at Kinergizer.com.

A microcontroller 460 contains a processor 564 controlling the relay 680 by the air compressor control signal 681. In the embodiment of FIG. 6, the DC motor 440 has a single on or off state. A slider valve 690 is controlled by an air control signal 581 from the processor 560 of the microcontroller 460. The slider valve 690 determines whether the air compressor 650 provides air in a forward or reverse direction to or from the tire to atmosphere. An atmospheric hose 411 to the outside tire atmosphere. A short hose 412 remains inside the tire. In normal operation, the air compressor 650 pulls air from atmosphere through the atmospheric long hose 411 and pushes air through the short hose 412 into the tire to fill the tire with air and increase pressure of the tire. In the event the tire has too great a pressure, the slider valve 690 is controlled to a reverse direction by the valve control signal 691. In this reverse direction, air is pulled through the short hose 412 by the air compressor 650 and pushed into the atmosphere on the outside of the tire by the atmospheric hose 412. Software in the microcontroller 460 determines which direction the processor 5650 commands the slider valve 690 by the valve control signal 691. Although a slider valve 690 is illustrated, other types of valves besides sliding valves can be used. The processor 560 decides which way to control the slider valve 690 based on at least the parameters stored in the air pressure memory 562.

The processor 560 also uses an operation memory 569. The operation memory 569 contains software commands and/or firmware and scratchpad memory and RAM for the processor 560. An air pressure sensor 563 is located inside the volume of the tire and measures the air pressure of the tire. The microcontroller 460 connects to the air pressure sensor 563 to receive the measurement from the air pressure sensor 563. Also located inside on the tire or on the rim of the tire is an accelerometer 565 for measuring acceleration and a temperature sensor 567 for detecting temperature. The microcontroller 460 connects to the accelerometer 565 and the temperature sensor 567 to respectively receive and store measured acceleration data into the acceleration memory 564 and measured temperature data into the temperature memory 566. The processor 560 of the microcontroller 460 can use the temperature in temperature memory 566 to compensate the air pressure received an air pressure memory 562. Additionally the processor 560 of the microcontroller for 60 can determine if there is a fault in the tire by an over temperature condition. The value of the temperature and in the temperature memory 566 can be compared by the processor 562 against a predetermined over temperature threshold. When the temperature in the temperature memory is above the predetermined over temperature threshold, the processor 560 of the microcontroller 460 can send an alert to the short-range radio transceiver 570 over the antenna 571. Power 532 is delivered to the short-range radio transceiver 570 and the microcontroller 460 by the supercapacitor 420 and the battery 425. The power 532 can alternately come from a power converter such as the power converter 533. The acceleration data in the acceleration memory 564 is sent by the processor 560 of the microcontroller 460 over the short-range radio transceiver 570 and the antenna 571 to the central ODB module for calculation of learned tire location, say after installation or rotation of new tires. The short-range radio transceiver 570 is typically a Bluetooth transceiver or other transceiver such as Bluetooth BLE or WiFi. Additionally, the processor 560 of the microcontroller 460 sends air pressure measurements from the air pressure memory 562 over the short-range radio transceiver 570 and the antenna 571. These values sent over the short-range radio transceiver are picked up by the central ODB module for reporting to a user or the central server.

Figure 7:
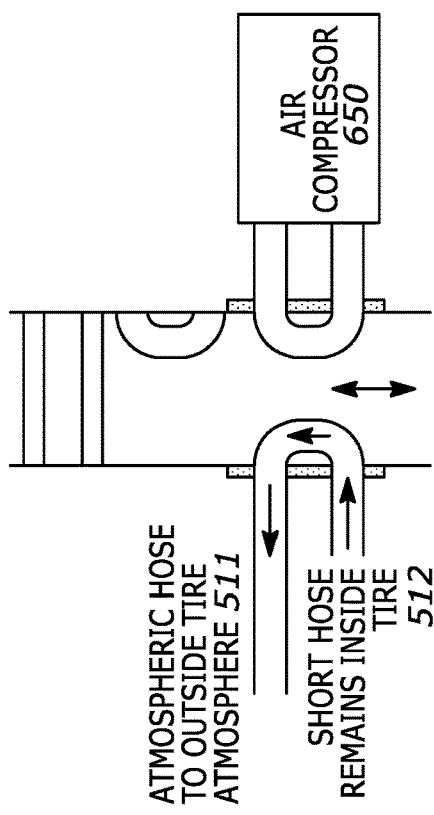
FIG. 7 illustrates a schematic diagram of operation of the reversible air compressor of FIG. 5 according to the one embodiment of the present inventions.

FIG. 7 illustrates a schematic diagram of operation of the reversible air compressor of FIG. 5 according to the one embodiment of the present inventions. In the embodiment of FIGS. 5 and 7, the DC motor has a dual forward or reverse state. An air control signal from the processor 560 of the microcontroller 460 determines whether the air compressor 550 operates provides air in a forward or reverse direction by the direction of the reversible shaft 541 from the DC motor 440. A short hose 412 remains inside the tire. In normal operation, the reversible air compressor 550 pulls air from atmosphere through the atmospheric long hose 411 and pushes air through the short hose 412 into the tire to fill the tire with air and increase pressure of the tire. In the event the tire has too great a pressure, the processor 561 sends the air control signal 581 to the relay to reverse the polarity and thus the direction of the DC motor 440 and the shaft reversible 541. In this reverse direction, air is pulled through the short hose 412 by the air compressor 550 and pushed into the atmosphere on the outside of the tire by the atmospheric hose 412. The processor 560 decides which way the air pressure control signal 581 commands the relay 580 based on at least the parameters stored in the air pressure memory 562.

Figure 8:
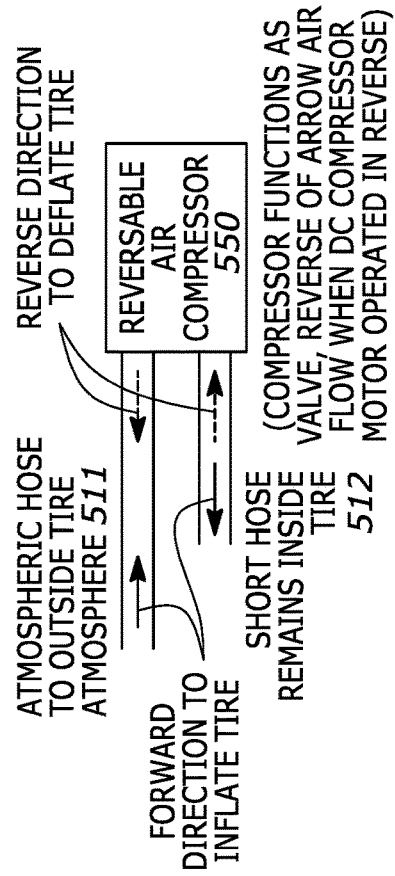
FIGS. 8-10 illustrate schematic diagrams of three exemplary states of operation of the valve of FIG. 6 according to the another embodiment of the present inventions.
Figure 9:
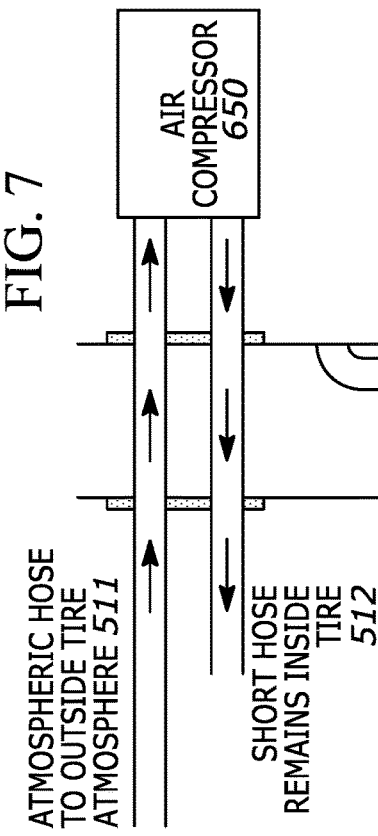
Figure 10:
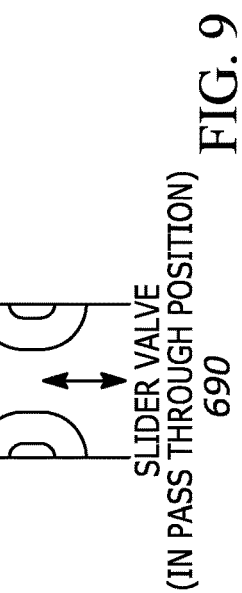

FIGS. 8-10 illustrate schematic diagrams of three exemplary states of operation of the valve of FIG. 6 according to the another embodiment of the present inventions. An atmospheric hose 411 to the outside tire atmosphere. A short hose 412 remains inside the tire. The slider valve 690 is controlled by an air control signal 581 from the processor 560 of the microcontroller 460. The slider valve 690 determines whether the air compressor 650 provides air in a forward or reverse direction to or from the tire to atmosphere. Although a slider valve 690 is illustrated in FIGS. 8-10, other types of valves besides sliding valves can be used.

In the embodiment of FIGS. 8 and 6, the slider valve is a release position. In the event the tire has too great a pressure, the slider valve 690 is controlled to a reverse direction by the valve control signal 691. In this reverse direction, air is pulled through the short hose 412 by the air compressor 650 and pushed into the atmosphere on the outside of the tire by the atmospheric hose 412.

In the embodiment of FIGS. 9 and 6, the slider valve is in a pass through position. In normal operation, the air compressor 650 pulls air from atmosphere through the atmospheric long hose 411 and pushes air through the short hose 412 into the tire to fill the tire with air and increase pressure of the tire.

In the embodiment of FIGS. 10 and 6, the slider valve is in a closed position. This is a rest positon. The slider valve 690 can have an optional safety channel 651 to give air somewhere to go upon a fault condition such as if the air compressor 650 is inadvertently activated when the slider valve 690 is in the closed positon or if the slider valve 690 sticks.

The microcontroller in the inflator box can also shut down the motor to protect the motor and not allow the motor to fail due to uninterrupted usage. The microcontroller is electrically designed to only operate the inflator box. The inflator box will wirelessly communicate in real time with the customer's tires and the customer to provide real time tire pressures. The inflator box's wireless communication function will allow the user to open the app, to check each individual tire pressure, as well as how much battery life they have left in each individual inflator box. The inflator app can also allow communication from the central server to the customer. For example, if there is continues or rapid decrease in tire pressure, the central server can be able to send a message to the customer's smartphone. The central server can warn the customer that there could be a catastrophic failure to a tire and the app will provide the nearest mechanic shop to the customer.

The motion activated power generator is the main power source for the inflator box. As the vehicle is in motion and the tires spin the motion activated power generator is harvesting energy. This energy is stored and transferred to the supercapacitor and the battery or backup battery. If the tire pressure is too low, the microcontroller will take the stored supercapacitor's energy and turn on the 12V DC motor. The air compressor moves back and forth within a hallow cylinder, activated by the 12V DC motor. The back and forth motion of the air compressor creates air pressure within the tire. The air compressor opens the valve stem by inhaling air from the atmosphere and adding the air to the inside of each tire; thus, increasing the PSI of the tire. If the inflator box recognizes that the tire PSI is exceeding the OEM manufacture tire PSI specification the inflator box valve stem will release the required amount of tire pressure into the atmosphere, thus, bringing the tire PSI to the OEM PSI specification. As an example, if the OEM tire pressure calls for 36 PSI and the valve stem detects the increase in PSI to 39, the valve stem releases air from the tire through the valve stem into the atmosphere, thus, bringing the pre-set PSI of to 36. The inflator box can both increase pressure and release pressure in any given tire from 14" to 22", in real time. The inflator box's valve stem also functions as an industry standard valve stem, for adding air into the tire or deflating the tire to the customer OEM manufacture tire PSI specification. If the inflator box detects that the tire pressure is low by 3 PSI, the inflator box will engage and activate the inflator box's 12V DC Air Compressor to inflate the tire to the OEM PSI specification. Once the PSI tire pressure has reached the manufacturer's specification, the microcontroller will deactivate the inflator box for shut off. The microcontroller on each individual inflator box will also shut down the 12V DC motor to protect and not allow the 12V DC motor to fail due to continuous usage. The short-range radio transceiver allows the inflator box to communicate via Bluetooth with the customer's inflator app, which allows the inflator box to relay all tire PSI information in real time to the customer; at the customer's command. The inflator app can also allow communication from the central server to the customer. For example, if there exists continuous or rapid decrease in tire pressure, the inflator app, will send a message to the customer's smartphone. The central server through the app touchscreen will warn the customer that there could be a catastrophic failure to a tire and the app touchscreen will provide the nearest mechanic shop to the customer. The accelerometer is the component that will measure tire position for each inflator box. This is to accurately show which tire is at which position, for the customer information in the inflator app. In case the vehicle's tires are switched around during any tire rotation, our built in accelerometer is the part that will keep all of the data and information of the tires correct on the app touchscreen. The accelerometer, is a device within the inflator Box that will determine the position of each tire regardless of outside intervention of mechanical rotation of the tires. The accelerometer will also calculate tire speed to determine which tire is at which position on the vehicle.

FIGS. 11 and 12 illustrate perspective views of the central OBD module 1110 with a single connector 1530 according to one embodiment of the present inventions. Male connector 1530 and female connector 1535 allow the central OBD module 1310 to fit in the vehicle yet also accommodate another OBD module that may be connected in series. The central OBD module 1310 includes a short-range radio transceiver 1570 and a short-range antenna 1571 connected thereto. The central OBD module 1310 also includes a cellular transceiver 1530 and a cellular antenna 1531 connected thereto. The short-range radio transceiver 1570 and the cellular transceiver 1530 coupled on a circuit board of the microcontroller 1560.

FIGS. 13 and 14 illustrate perspective views of the central OBD module 1310 with dual connectors 1530, 1535 according to another embodiment of the present inventions. A single male connector 1530 allow the central OBD module 1310 to fit in the vehicle. The central OBD module 1310 includes a short-range radio transceiver 1570 and a short-range antenna 1571 connected thereto. The central OBD module 1310 also includes a cellular transceiver 1530 and a cellular antenna 1531 connected thereto. The short-range radio transceiver 1570 and the cellular transceiver 1530 coupled on a circuit board of the microcontroller 1560.

Figure 15:
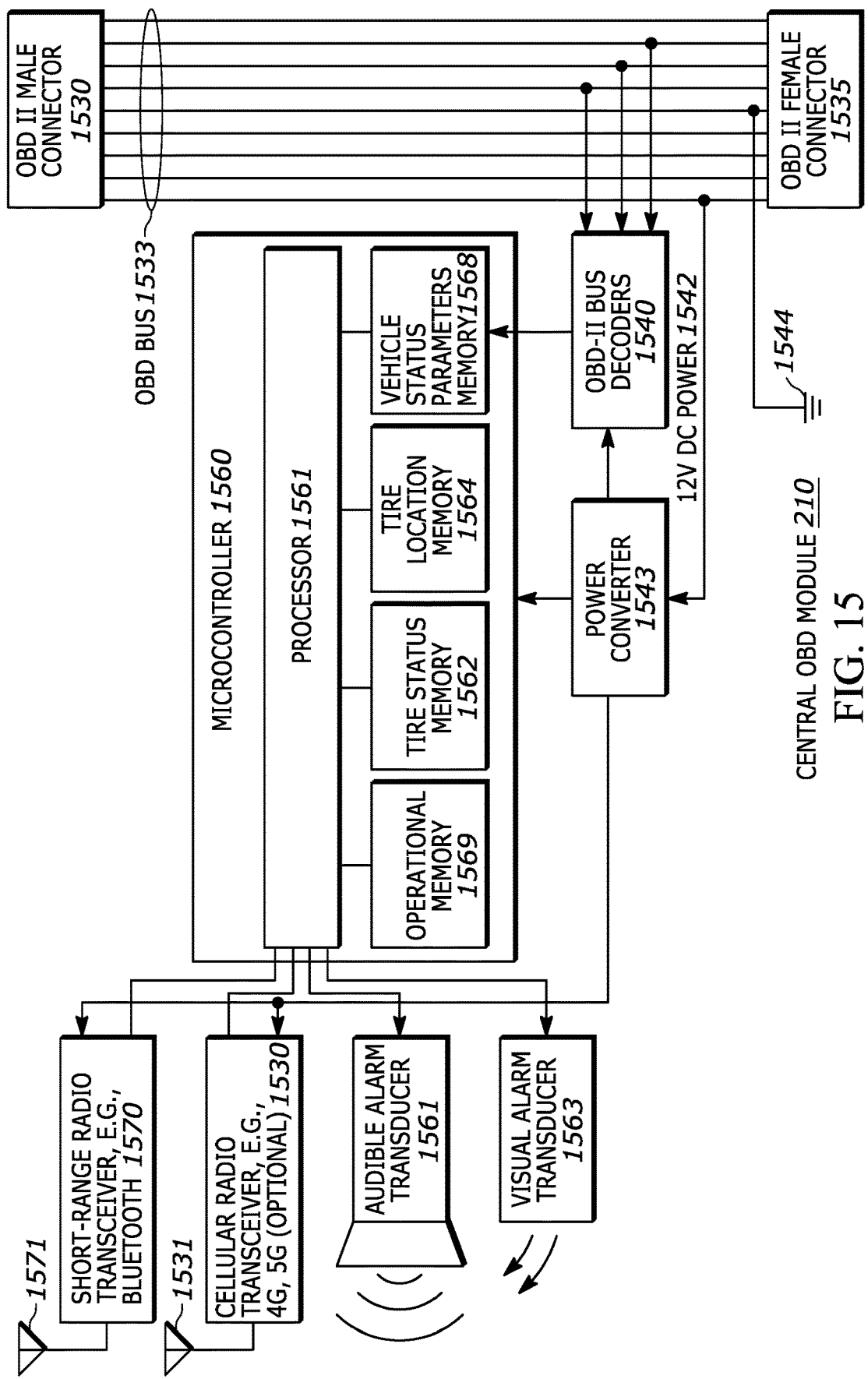
FIG. 15 illustrates a schematic block diagram of the central OBD module of the another embodiment of FIGS. 13 and 14 according to one embodiment of the present inventions.

FIG. 15 illustrates a schematic block diagram of the central OBD module 210 of the another embodiment of FIGS. 13 and 14 according to one embodiment of the present inventions. The central OBD module 210 has a male OBD-II connector 1530 and a female OBD-II connector 1535 connected between the OBD bus 1533 internal to the central OBD module 210. The central OBD module 210 derives 12 V DC power 1542 from the OBD bus 1533 and ground 1544. A power converter 1543 can be optionally used to convert the 12 V DC power to voltages needed for operation of the microcontroller 1560, the OBD-II bus decoders 1540, and other components such as a short-range radio transceiver 1570 and a cellular radio transceiver 1530. It is noted that the cellular radio transmitter 1530 is optional, depending on the configuration's this discussed previously in FIGS. 2 and 3.

The microcontroller 1560 contains processor 1561 and four memories, and operational memory 1569, a tire status memory 1562, a tire location memories 1564 and a vehicle status parameters memory 1568. The vehicle status parameters memory 1568 obtains vehicle status parameters from the OBD-II bus decoders 1540. The operational memory 1569 contain software and/or firmware and scratchpad memory and RAM for the processor 1561. The tire status memory 1562 stores tire status information received over the short-range radio transceiver 1571 from the inflator boxes on each of the tires of the vehicle associated with the central OBD module 210. The short-range radio transceiver 1571 is preferably Bluetooth or Bluetooth BLE or WiFi and has an associated antenna 1571. The cellular radio transceiver 1530 is optional and has an associated antenna 1531.

The tire status information stored in the tire status memory 1562 can include tire pressure for each tire, tire ID number for each tire, tire temperature information for each tire and tire acceleration data for each tire. The processor 1561 periodically checks the acceleration data stored in the tire status memory 1562 to determine if the tires may have been reinstalled after rotation or are new. Processor 1561 is capable of comparing acceleration data for each tire with past acceleration data of each tire to determine if tires have moved to a new location or been reinstalled or replaced. Over time the processor 1561 can determine location of each of the four tires, either front right, from left, rewrite, or rear left. This can easily be accomplished when the vehicle is turning, the tires on one side will accelerate differently the tires of the other indicating left versus right tire placement location. Likewise, front and back placement can be determined by the relative acceleration of each the front back tires during turns or motion forward or backward. Thus, it is not necessary for the mechanic to program the inflator system of the present invention each time tires are remounted rotated or installed. The central OBD module to 10 can make this decision over time as a customer drives home from the tire shop. While it is preferred that a central ODB module 210 makes this determination and contains the circuitry necessary to do so, it's also possible that the central server can make these decisions if this processing does want to be included in a more powerful processor 1561 of the central ODB module 210. However, each of the individual inflator boxes is incapable determining its location unless the inflator boxes communicate with one another to share acceleration data. If the inflator system was installed and an OEM vehicle, the comparison of acceleration data could be done on board within the OEM vehicle computer to determine tire location after reinstallation, rotation or new tires. Thus, sensors are not needed attached in the corresponding wheel well for each tire but, rather, a tire ID can exist on each tire and the tires we moved around the vehicle without confusion as to the location because an internal accelerometer within each tire plus the tire ID that is sent wirelessly to a central short-range radio receiver in the vehicle will allow central determination location of each tire even after it repositioning after rotation or new installation. Not only does is allow tires once installed with internal air pumps, but those tires do not need to be placed near a sensor for each wheel well. Only one central short-range radio receiver or transceiver is required. And with the internal motion activated power generator in each inflator box, individual charging quails are not needed at each tire.

The central OBD module 210 also includes an audible alarm transceiver 1561 and a visual alarm transducer 1563 connected to the processor 1561. In this way, when the tire status memory 1562 indicates a tire pressure or tire temperature status which is out of tolerance with predetermined thresholds, the driver of a vehicle can be warned of a fault condition by audible alarm and visible flashing LED, for example. That way, if the user's smart phone is off or not connected via Bluetooth to the central OBD module, or is not connected to the cellular towers or mobile data on the internet to receive texts or messages or alerts, the driver still has an opportunity to receive a warning. Of course, if the functionality is built into an OEM vehicle, these alarms can be built into the warning system of the vehicle itself. However, this invention is contemplated to at least initially be deployed as an aftermarket installation that works in parallel with existing TPMS sensors, if already installed, and does not require any wiring or modification of wheel wells or tire rims or vehicle electronics.

Figure 16:
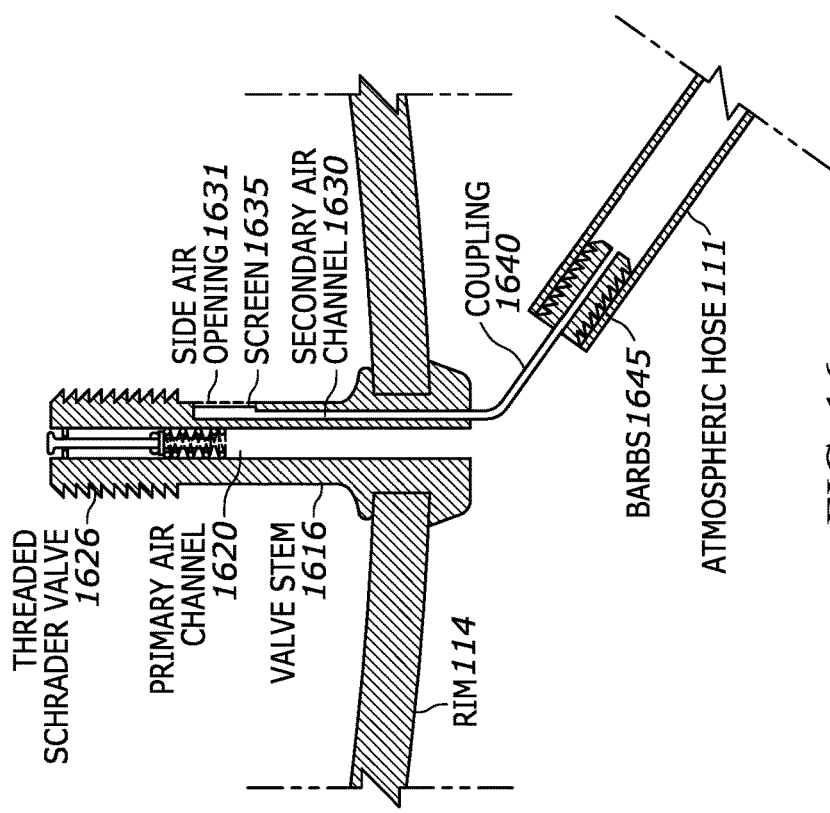
FIG. 16 illustrates a cutaway view of a custom valve stem mounted on a rim of a vehicle according to one embodiment of the present inventions.

FIG. 16 illustrates a cutaway view of a custom valve stem 1616 mounted on a rim 114 of a vehicle according to one embodiment of the present inventions. The custom valve stem 1616 has a primary air channel 1620 and a secondary air channel 1630 as illustrated in FIG. 16. The primary air channel 1620 couples at a top to a conventional threaded Schrader valve 1626. While a Schrader valve is illustrated, other types of valves can be used, however, the Schrader valve is most popular and widely deployed. An ordinary tire pump can be used to pump a tire through the threaded shaver Schrader valve 1626. However, the inflator box can also be used pump the tire. When the inflator box pumps a tire, the inflator box needs a source of air from the outside. This atmospheric air enters the air compressor of the inflator box through the secondary air channel 1630. The secondary air channel 1630 has a side air opening 1631 exposed to atmosphere. A screen 1635 can be deployed in the embodiment illustrated to keep dust, road debris, dirt and the like from entering the air compressor and damaging its pistons. A coupling 1640 is placed between the atmospheric hose 111 and the valve stem 1616. The coupling 1640 connects to the atmospheric hose 111 by a plug with barbs 1645 as illustrated in FIG. 16.

Figure 17:
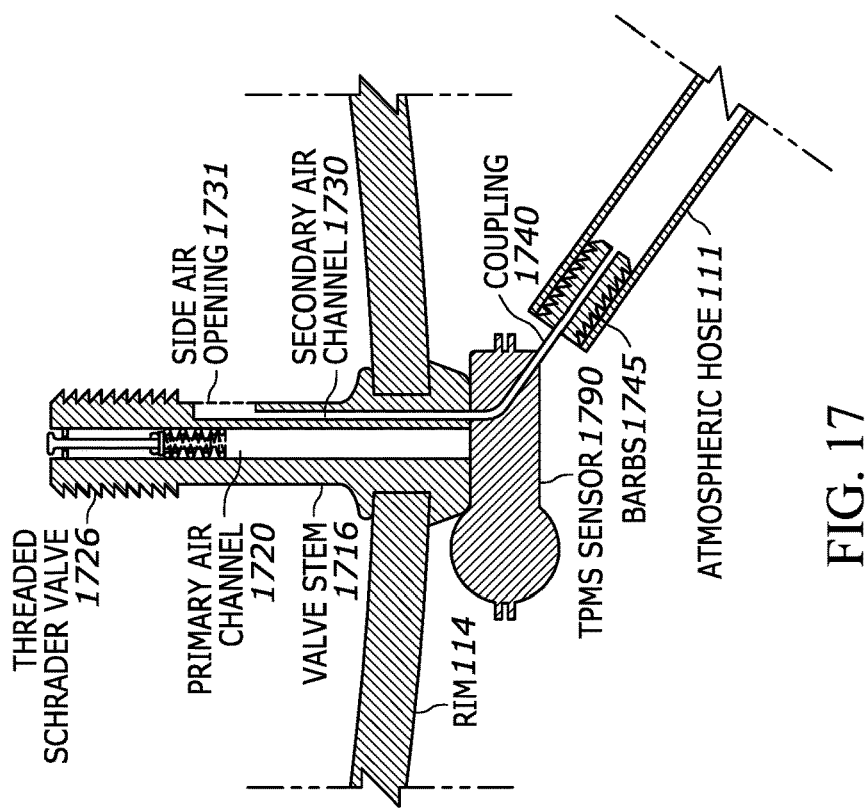
FIG. 17 illustrates a cutaway view of a custom valve stem next to a tire pressure monitoring system (TPMS) sensor mounted on the rim for a tire according to another embodiment of the present inventions.

FIG. 17 illustrates a cutaway view of a custom valve stem 1716 next to a tire pressure monitoring system (TPMS) sensor 1790 mounted on the rim 114 for a tire according to another embodiment of the present inventions. A tire pressure monitoring sensor (TPMS sensor) 1790 may preexist in a vehicle before installation of the inflator box with custom valve stem 1716. The custom valve stem 1716 is installed in place of the original valve stem of a tire so that a secondary air channel 1730 is available for atmospheric air to enter the air compressor of the inflator box inside the tire. The TPMS sensor 1790 then attaches to the new custom valve stem 1760. The custom valve stem 1760 has a primary air channel 1720 and a secondary air channel 1730. The secondary air channel 1730 has a side air opening 1731 to atmosphere. In the embodiment of FIG. 17, no screen is illustrated. However, a screen can still be used with a TPMS sensor and, alternatively, without the TPMS sensor, a screen can be omitted, either way in any combination. The embodiment of FIG. 17 also has a threaded Schrader valve 1726 and in the primary air channel 1720.

Figure 18:
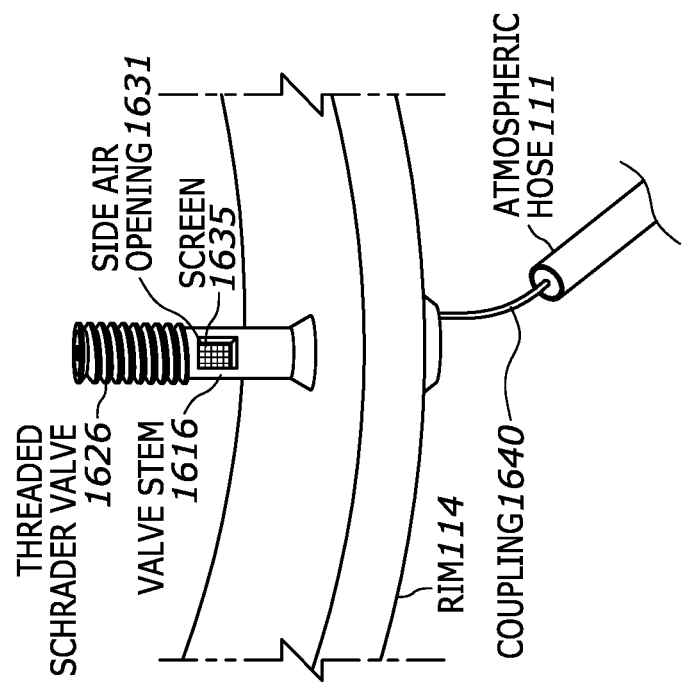
FIG. 18 illustrates a side view of the custom valve stem mounted on a cutaway of the rim of FIG. 16 according the one embodiment of the present inventions.

FIG. 18 illustrates a side view of the custom valve stem 1616 mounted on a cutaway of the rim 114 of FIG. 16 according the one embodiment of the present inventions. The custom valve stem 1616 has a side air opening 1631 exposed to atmosphere for atmospheric air to enter the air compressor of the inflator box through the secondary air channel. A screen 1635 can be deployed in the embodiment illustrated to keep dust, road debris, dirt and the like from entering the air compressor and damaging its pistons. A coupling 1640 is placed between the atmospheric hose 111 and the valve stem 1616.

Figure 19:
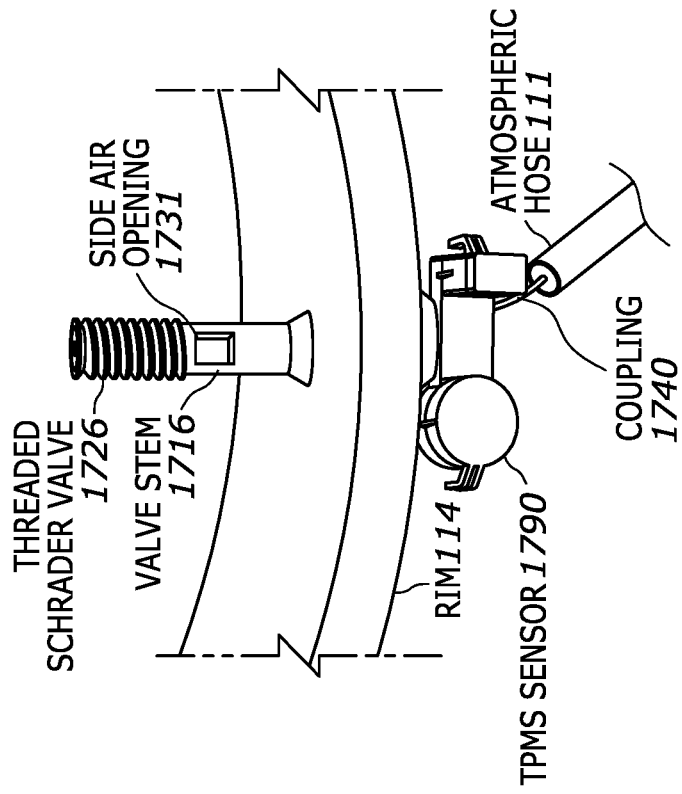
FIG. 19 illustrates a side view of the custom valve stem next to the TPMS sensor mounted on a cutaway of the rim of FIG. 17 according the another embodiment of the present inventions.

FIG. 19 illustrates a side view of the custom valve stem 1716 next to the TPMS sensor 1790 mounted on a cutaway of the rim 114 of FIG. 17 according the another embodiment of the present inventions. A tire pressure monitoring sensor (TPMS sensor) 1790 may preexist in a vehicle before installation of the inflator box with custom valve stem 1716. The custom valve stem 1716 is installed in place of the original valve stem of a tire so that a secondary air channel is available for atmospheric air to enter the air compressor of the inflator box inside the tire. The TPMS sensor 1790 then attaches to the new custom valve stem 1760. The secondary air channel has a side air opening 1731 to atmosphere. In the embodiment of FIG. 17, no screen is illustrated. However, a screen can still be used with a TPMS sensor and, alternatively, without the TPMS sensor, a screen can be omitted, either way in any combination. The embodiment of FIG. 19 also has a threaded Schrader valve 1726.

One component to this operation is the custom valve stem. Drilling a new hole in the rim for a secondary air channel is not desirable, especially for aftermarket instillations. The new custom valve stem acts as an inlet and also an outlet for air to pass through. When the compressor needs to pump air into the tire, it draws air from the outside through our custom valve stem. The custom valve stem will have the standard design as normal valve stems do; our custom stem will also have a small slit on the side of the valve stem that acts as the inlet/outlet for air. The valve stem flap will open up allowing air to be sucked into the tire. On the contrary, if the valve stem senses too much pressure into the tire, the flap will also open up and release the necessary amount of air needed to satisfy the PSI requirement of the tire. The custom valve stem fits in the existing hole the old valve stem sat in. The custom valve stem attaches itself only to the existing TPMS sensor. For the customer's protection, the tire will now have two TPMS sensors inside; the existing TPMS sensor from the factory that indicates low tire pressure on the consumer's dashboard and our TPMS sensor inside inflator box to signal when tire pressure is low. The TPMS sensor inside will indicate to the customer's smartphone as well as signal to the inflator box to kickstart the pump to ensure correct tire pressure. Just how the TPMS sensors will guard against under inflation, our custom valve stem also guards against over inflation through the release of air.

Figure 20:
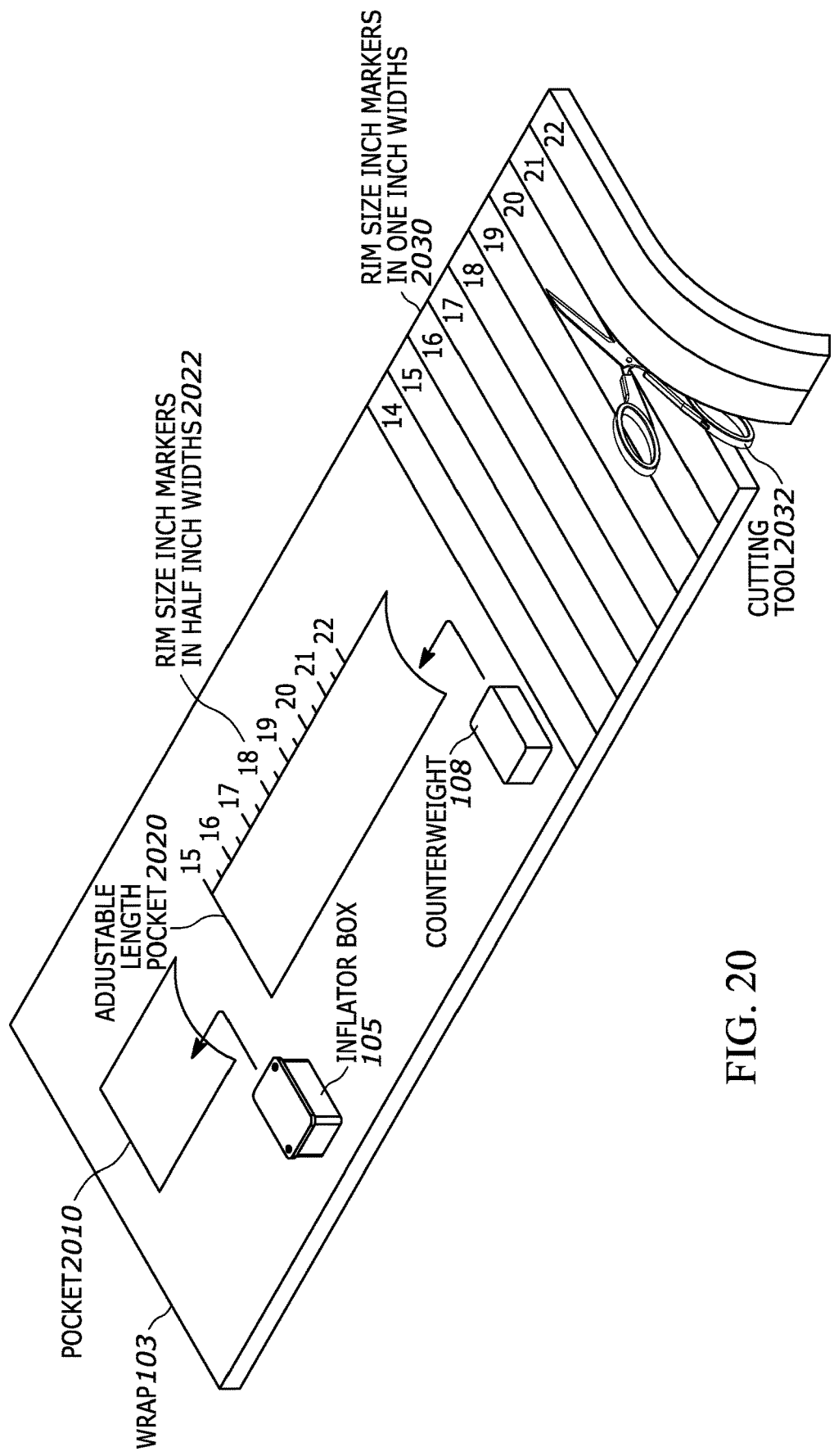
FIG. 20 illustrates a perspective view of a wrap in a first step for installation on the rim according the embodiments of the present inventions.

FIG. 20 illustrates a perspective view of a wrap 103 in a first step for installation on the rim according the embodiments of the present inventions. In the first step, a cutting tool 2032 such as a scissors or a utility knife is used to cut the length of the wrap 103 to match a rim size by removing the necessary section indicated by rim size inch markers 2030. Each rim size inch marker 2030 is in one inch widths. Next in the first step inflator box 105 is inserted in the pocket 2010 on a top side of the wrap 103. Next in the first step the counterweight 108 is inserted in the adjustable length pocket to a depth corresponding to the rim size. Rim size inch markers 2022 indicate the depth in the adjustable length pocket 2020 that the counterweight 108 should be positioned. Note that the rim size inch markers 2022 are in half inch widths as opposed to the rim size inch markers 2030 which are in one inch widths. This is because the counterweight 108 is positioned half the distance on the rim from the full circumference so long as s single counterweight is deployed.

Figure 21:
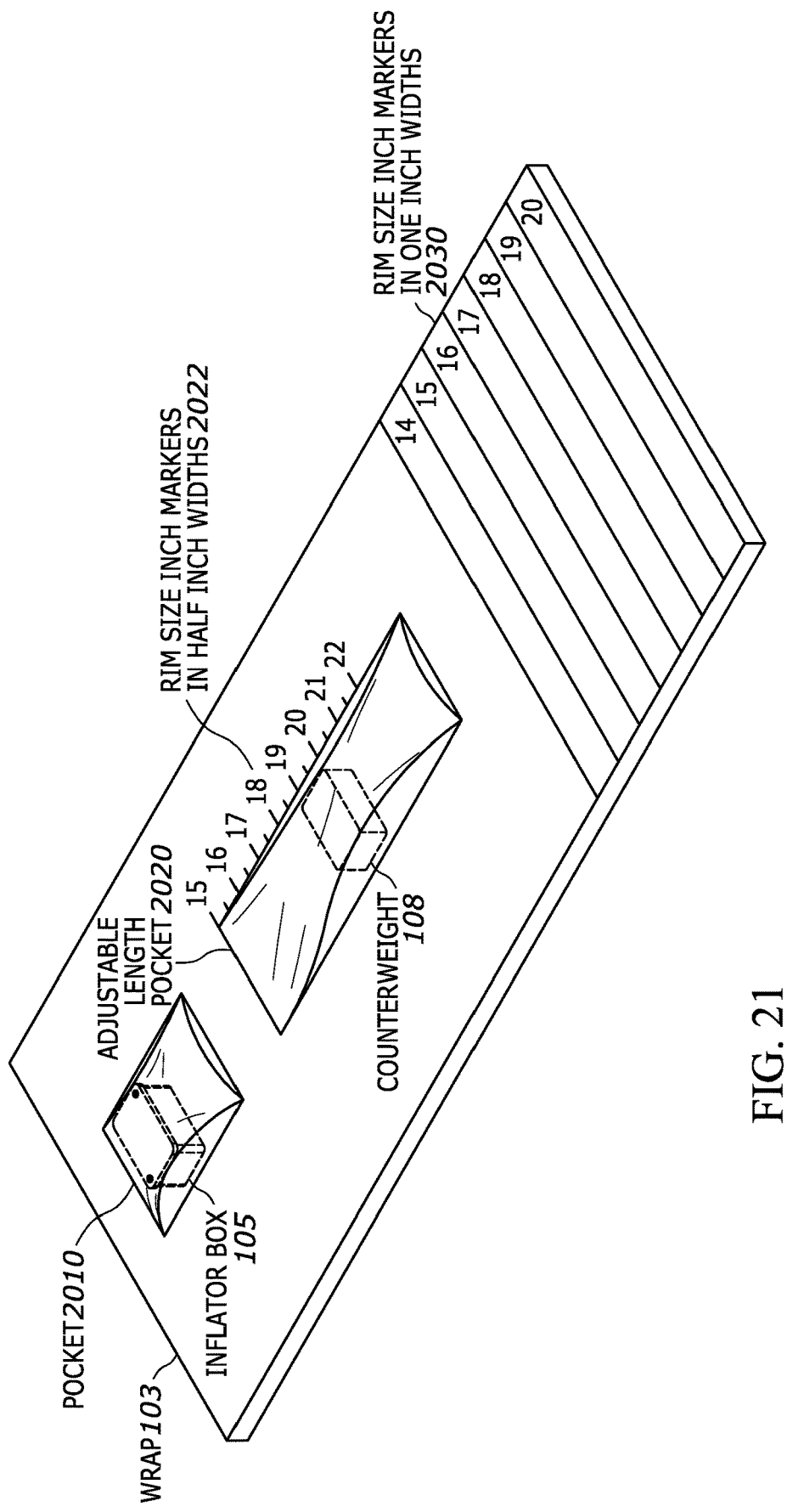
FIG. 21 illustrates a perspective view of the wrap in a second step for installation on the rim according the embodiments of the present inventions.

FIG. 21 illustrates a perspective view of the wrap 103 in a second step for installation on the rim according the embodiments of the present inventions. In the second step, the wrap 103 has already been cut to the desired length. Next the inflator box 105 is positioned in the pocket 2010 and the counterweight 108 is positioned in the adjustable length pocket 2020. Ian an upcoming third and fourth steps, the wrap 103 will be shrunk around the rim as will be illustrated in upcoming FIGS. 26 and 27.

Figure 22:
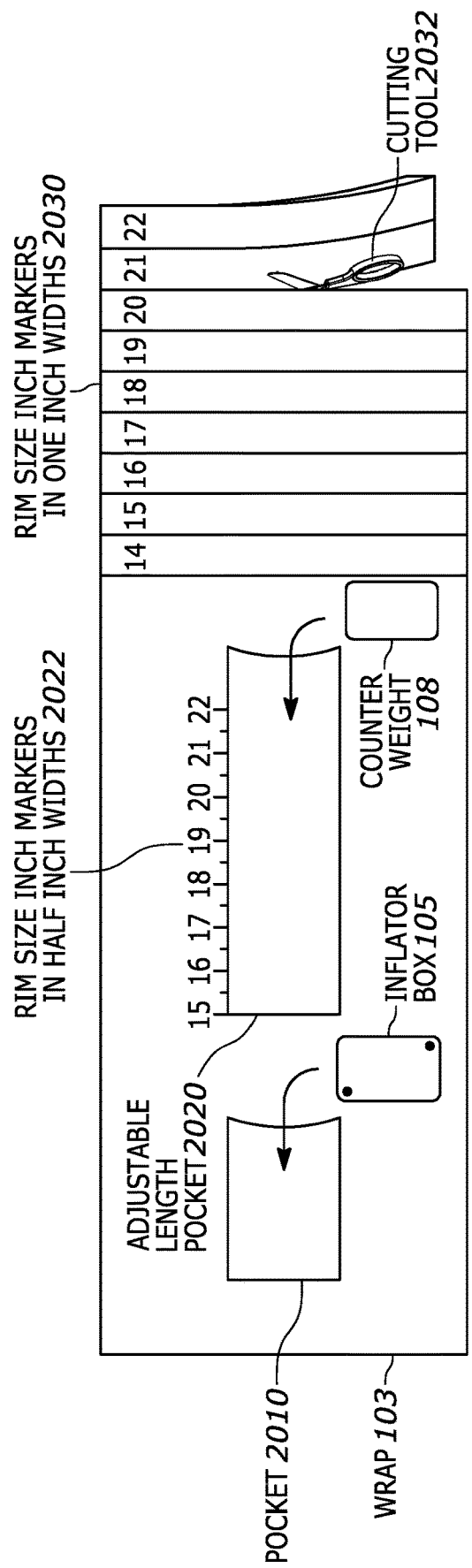
FIG. 22 illustrates a plan view of the wrap in the first step for the installation on the rim according the embodiments of the present inventions.

FIG. 22 illustrates a plan view of the wrap 103 in the first step for the installation on the rim according the embodiments of the present inventions. In the first step, a cutting tool 2032 such as a scissors or a utility knife is used to cut the length of the wrap 103 to match a rim size by removing the necessary section indicated by rim size inch markers 2030. Each rim size inch marker 2030 is in one inch widths. Next in the first step inflator box 105 is inserted in the pocket 2010 on a top side of the wrap 103. Next in the first step the counterweight 108 is inserted in the adjustable length pocket 2020 to a depth corresponding to the rim size. Rim size inch markers 2022 indicate the depth in the adjustable length pocket 2020 that the counterweight 108 should be positioned. Note that the rim size inch markers 2022 are in half inch widths as opposed to the rim size inch markers 2030 which are in one inch widths. This is because the counterweight 108 is positioned half the distance on the rim from the full circumference so long as a single counterweight is deployed.

Figure 23:
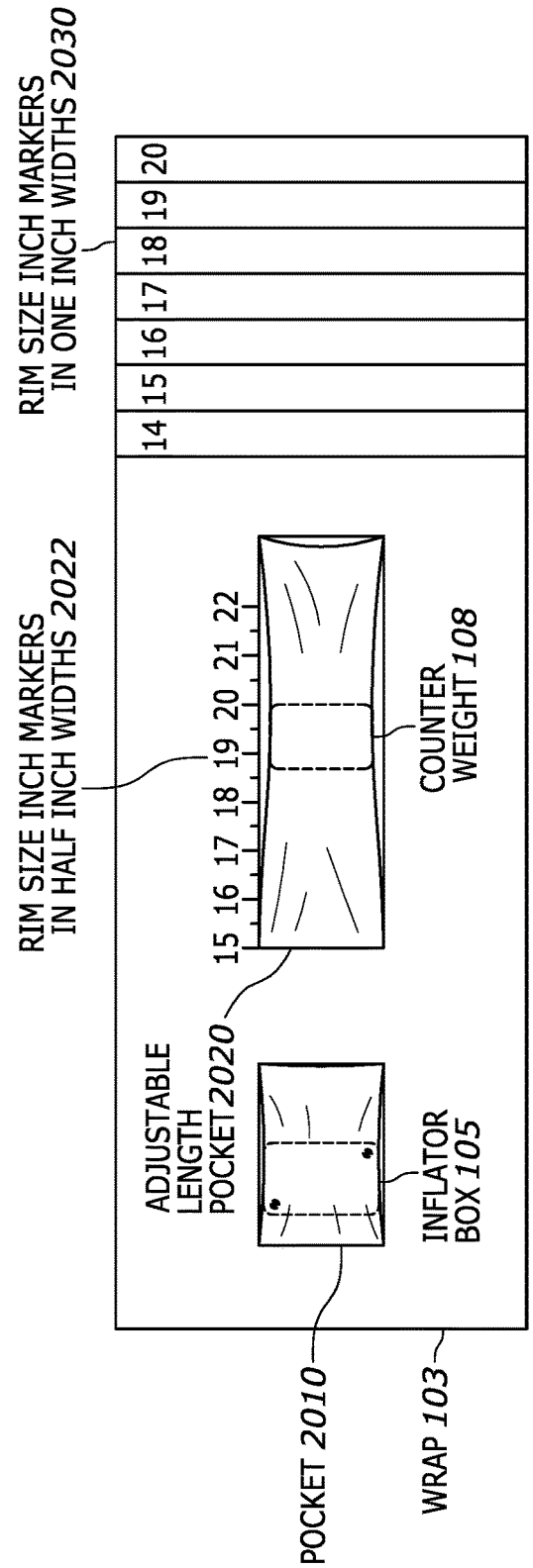
FIG. 23 illustrates a plan view of the wrap in the second step for the installation on the rim according the embodiments of the present inventions.

FIG. 23 illustrates a plan view of the wrap 103 in the second step for the installation on the rim according the embodiments of the present inventions. In the second step, the wrap 103 has already been cut to the desired length. Next the inflator box 105 is positioned in the pocket 2010 and the counterweight 108 is positioned in the adjustable length pocket 2020. In an upcoming third and fourth steps, the wrap 103 will be shrunk around the rim as will be illustrated in upcoming FIGS. 26 and 27.

FIG. 24 illustrates a plan view of an alternate wrap 103 in a first step for the installation on the rim according the embodiments of the present inventions. In the first step inflator box 105 is inserted in the pocket 2410 through a slit 2412 on an underside of the wrap 104. Next in the first step the counterweight 108 is inserted in the adjustable length pocket 2420 to a depth corresponding to the rim size through a slit 2422 on an underside of the wrap 104. Rim size inch markers 2022 indicate the depth in the adjustable length pocket 2020 that the counterweight 108 should be positioned. Note that the rim size inch markers 2022 are in half inch widths because the counterweight 108 is positioned half the distance on the rim from the full circumference so long as a single counterweight is deployed. Note that in the first step of the embodiment of FIG. 24, the wrap 104 is not cut to a length to match a rim size. Instead, when installed in the corresponding third step, the wrap merely overlaps itself on the rim.

FIG. 25 illustrates a plan view of the alternate wrap 103 in a second step for the installation on the rim according the embodiments of the present inventions. Next the inflator box 105 is positioned in the pocket 2410 and the counterweight 108 is positioned in the adjustable length pocket 2420. In an upcoming third and fourth steps, the wrap 104 will be shrunk around the rim as will be illustrated in upcoming FIGS. 28 and 29.

Figure 26:
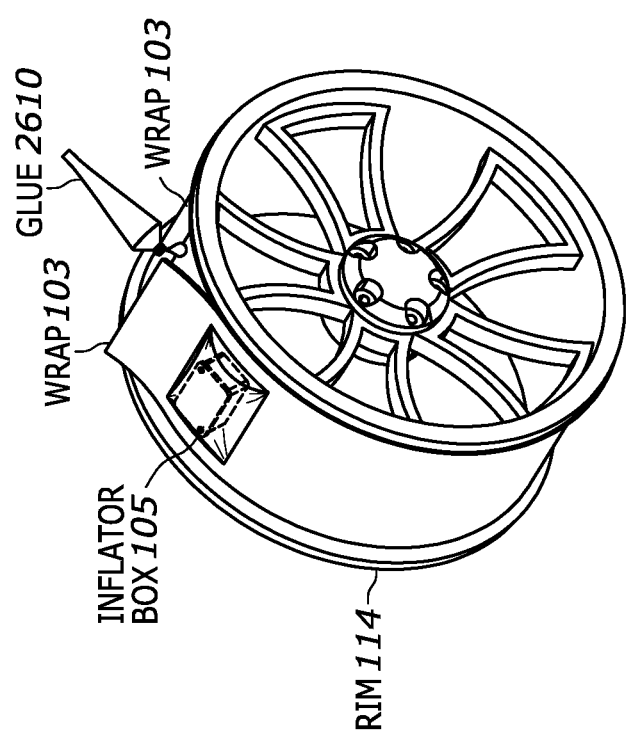
FIG. 26 illustrates a perspective view of the wrap installed on the rim in a third step according the embodiments of the present inventions.

FIG. 26 illustrates a perspective view of the wrap 103 installed on the rim 114 in a third step according the embodiments of the present inventions. The wrap 103 is glued to the rim by glue 2610. The inflator box 105 is in a pocket in the wrap 103. The wrap 103 can adhere to the rim 114 by applying a double stick zinc coated steel tape to the rim 114 first, instead or as a type of glue 2610, to make sure there is no movement of the inflator box 105 and counterweight or battery while being wrapped to the rim 114.

Figure 27:
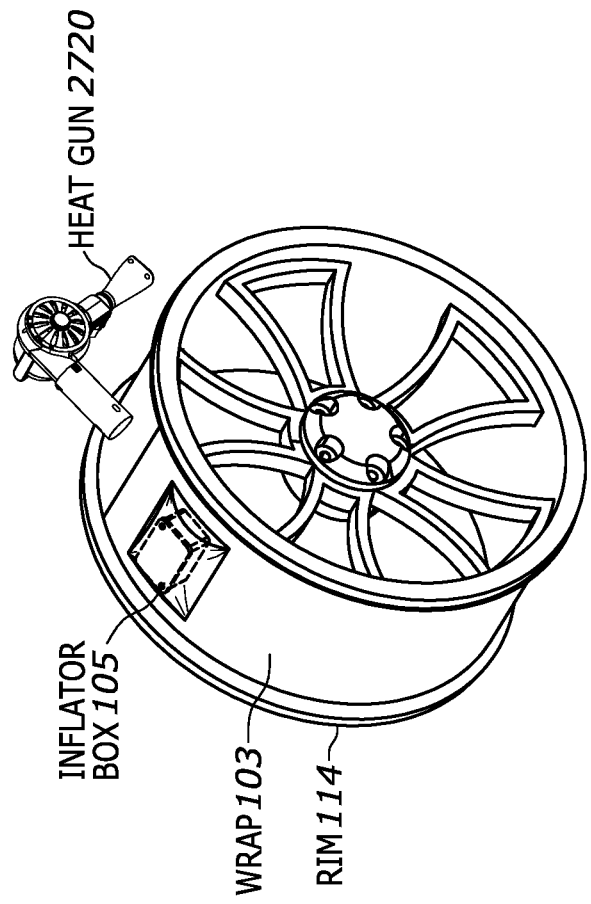
FIG. 27 illustrates a perspective view of the wrap installed on the rim in a fourth step according the embodiments of the present inventions.

FIG. 27 illustrates a perspective view of the wrap 103 installed on the rim 114 in a fourth step according the embodiments of the present inventions. The wrap 103 is heat shrunk to the rim by heat gun 2720. The inflator box 105 is in a pocket in the wrap 103.

Figure 28:
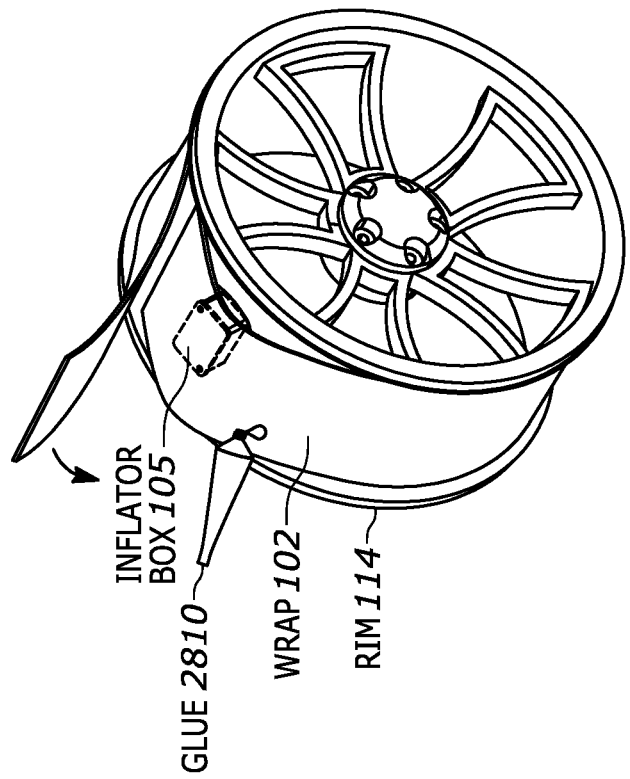
FIG. 28 illustrates a perspective view of another alternate wrap installed on the rim in a first step according the embodiments of the present inventions.

FIG. 28 illustrates a perspective view of another alternate wrap 102 installed on the rim 114 in a first step according the embodiments of the present inventions. The wrap 102 overlaps itself because it was not cut to a length of the rim 114 and is glued to the rim by glue 2810. The inflator box 105 is in a pocket on an underside of the wrap 102. The wrap 102 can adhere to the rim 114 by applying a double stick zinc coated steel tape to the rim 114 first, instead or as a type of glue 2810, to make sure there is no movement of the inflator box 105 and counterweight or battery while being wrapped to the rim 114.

Figure 29:
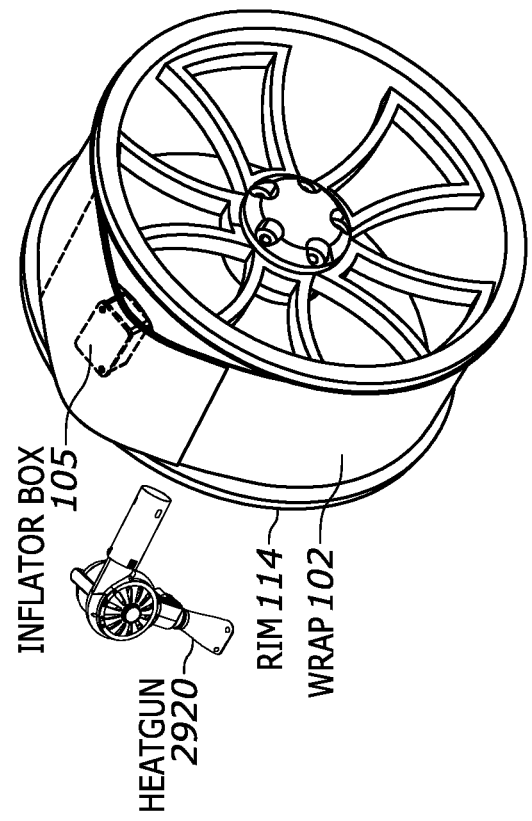
FIG. 29 illustrates a perspective view of the another alternate wrap installed on the rim in a second step according the embodiments of the present inventions.

FIG. 29 illustrates a perspective view of the another alternate wrap 102 installed on the rim 114 in a second step according the embodiments of the present inventions. The wrap 102 is heat shrunk to the rim by heat gun 2920. The inflator box 105 is in a pocket on an underside of the wrap 102. Alternately, in another embodiment, the pocket can be omitted and the inflator box 105 merely held by the force of the shrink wrap 102.

Figure 30:
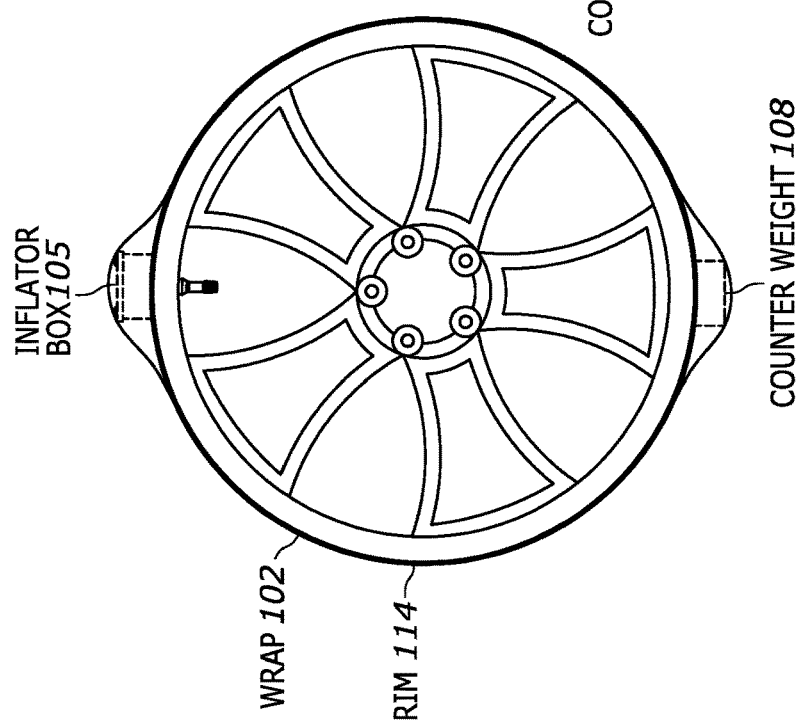
FIG. 30 illustrates a side view of an inflator box and a counter weight installed on the rim according the embodiments of the present inventions.

FIG. 30 illustrates a side view of an inflator box 105 and a counter weight 108 installed on the rim 114 according the embodiments of the present inventions. The inflator box 105 is in a pocket on an underside of the wrap 102. The counter weight 108 is also in a pocket on an underside of the wrap 102. Alternately, in another embodiment, the pocket can be omitted and the inflator box 105 and the counter weight 108 merely held by the force of the shrink wrap 102.

Figure 31:
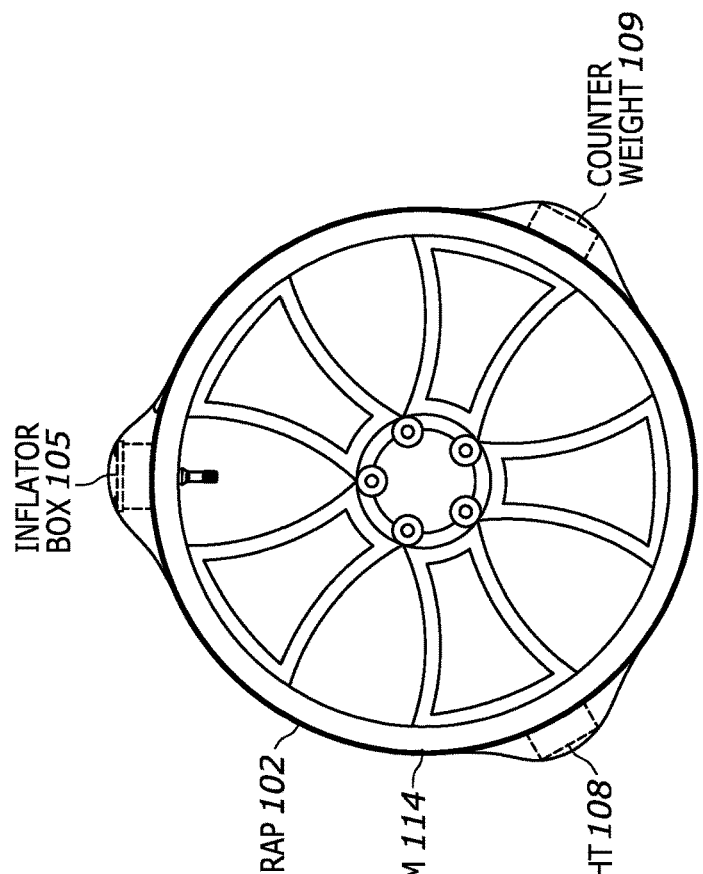
FIG. 31 illustrates a side view of an inflator box and more than one counter weight installed on the rim according the embodiments of the present inventions.

FIG. 31 illustrates a side view of an inflator box 105 and more than one counter weight 108, 109 installed on the rim 114 according the embodiments of the present inventions. The inflator box 105 is in a pocket on an underside of the wrap 102. The counter weights 108 and 109 are also in pockets on an underside of the wrap 102. The inflator box 105 and the counter weights 108 and 109 are positioned at equal spacing around the circumference of the rim 114 assuming all three are the same weight. Alternately, in another embodiment, the pockets can be omitted and the inflator box 105 and the counter weights 108 and 109 merely held by the force of the shrink wrap 102.

Figures 32, 33:
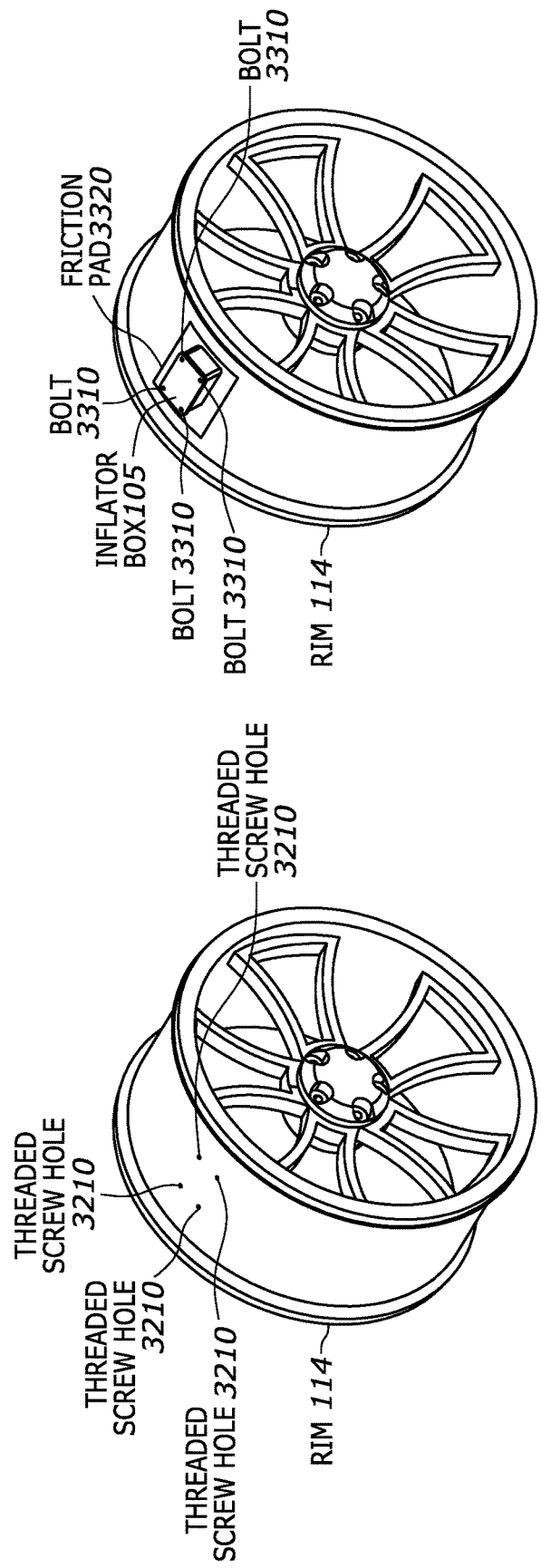
FIG. 32 illustrates a perspective view of a rim with mounting holes in a first alternate step of mounting according the embodiments of the present inventions.
FIG. 33 illustrates a perspective view of the inflator box mounted on the rim by bolts in a second alternate step of mounting according the embodiments of the present inventions.

FIG. 32 illustrates a perspective view of a rim 114 with mounting holes 3210 in a first alternate step of mounting according the embodiments of the present inventions. Threaded screw holes 3210 are illustrated formed in the rim 114. This embodiment is preferred for an OEM factory instillation. The initial contemplation for the inflator system is for an aftermarket installation. In an aftermarket installation, it is not preferred to modify by making holes in the vehicle, especially the rim.

FIG. 33 illustrates a perspective view of the inflator box 105 mounted on the rim 114 by bolts 3310 in a second alternate step of mounting according the embodiments of the present inventions. A friction pad 3320 is preferable positioned between the inflator box 105 and the rim 114. Bolts 3310 screw into the threaded screw holes in the rim 114. The bolts 3310 secure the inflator box to the rim 114. The friction pad can be made of sandpaper or rubber like material or vinyl. The purpose of the friction pad is to reduce slippage of the inflator box 105 on the rime as the wheel starts and stops, thus reducing vibration and shear forces on the bolts 3310.

Figure 34:
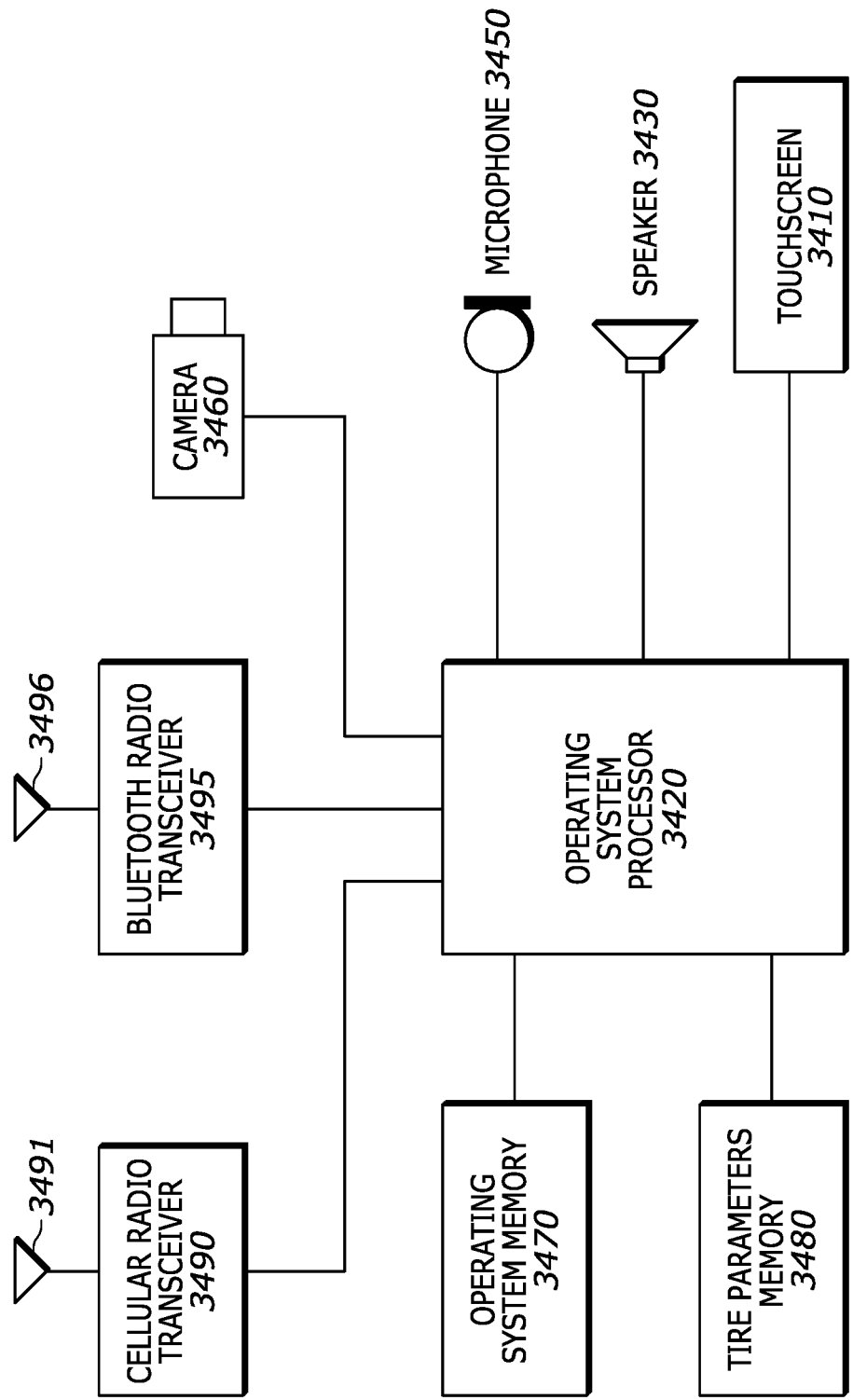
FIG. 34 illustrates a schematic block diagram of the smartphone of the embodiments of FIG. 2 or 3 according to embodiments of the present inventions.

FIG. 34 illustrates a schematic block diagram of the smartphone 220 of the embodiments of FIG. 2 or 3 according to embodiments of the present inventions. A face of the smartphone 220 is covered by a touchscreen 3410. The touchscreen allows a user to view a backlit display and additionally provide input keystrokes or commands to an operating system processor 3420 connected thereto. A human interface of the smartphone 220 also has a speaker 3430 and a microphone 3450 connected to the operating system processor for voice and video telephone communications and other uses. A camera 3460 is also connected to the operating system processor. The operating system processor 3420 interacts with an operating system memory 3470 and a tire parameters memory 3480. The operating system memory 3470 stores and provides software and firmware to the operating system processor 3420. The tire parameters memory 3480 stores condition data of the vehicle such as tire pressure data, tire acceleration data, tire location data, tire temperature data, and other vehicle parameters such as OBD data. The tire parameters memory 3480 receives the tire parameters and vehicle parameters over short-range radio transceiver circuitry such as a Bluetooth radio transceiver 3495 and associated antenna 3496 from the central OBD module. Other vehicle parameters can be received from the central server over the cellular radio transceiver 3490 and associated antenna 3491. The smartphone 220 contains cellular radio transceiver circuitry 3490 and the short-range radio transceiver circuitry such as the Bluetooth radio transceiver 3495 coupled to the operating system processor 3420 of the smartphone 220. The smartphone 220 can be a wireless tablet, laptop, or other phone or mobile device.

Figure 35:
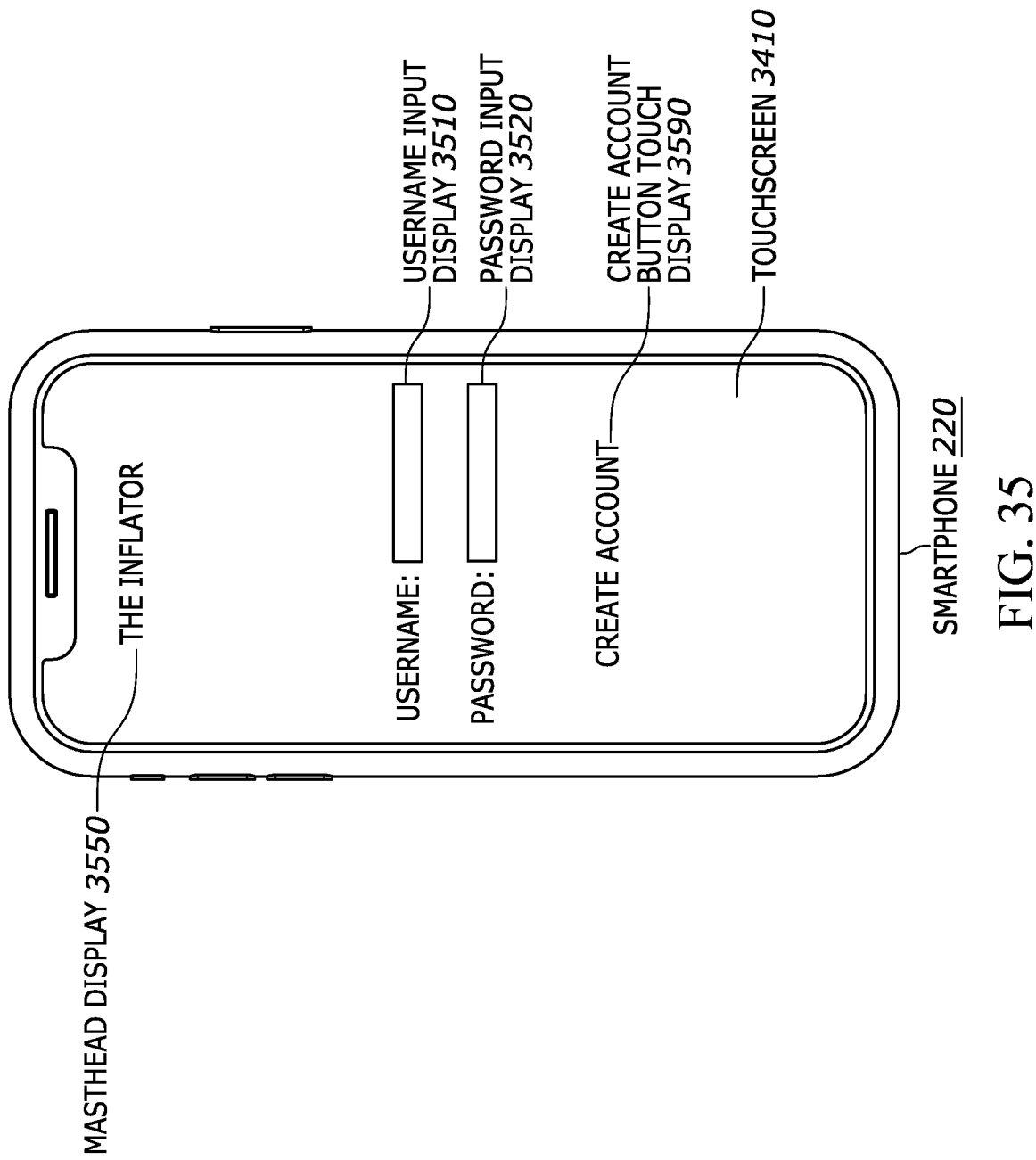
FIG. 35 illustrates a login screen view of the smartphone according to embodiments of the present inventions.

FIG. 35 illustrates a login screen view on the touchscreen 3410 of the smartphone 220 according to embodiments of the present inventions. The login screen view of FIG. 35 has a masthead display 3550. The masthead display 3550 can be the same of the app or company or tire system. A username input display 3510 and password input display 3520 are generated on the touchscreen 3410 by the operating system processor 3420 of the smartphone 220. The username input display 3510 and the password input display 3520 are used by the user of the smartphone 2202 to input the user's username and password for log-in to the central server which hosts the app content or underlying database for the app content. A create account button touch display 3590 is pressed by the user of the smartphone 220 when the username and the password are ready to submit to the central server. A help message display 2690 is generated on the touchscreen 3410 by the operating system processor 3420 of the smartphone 220. These displays are generated by the operating system processor 3420 using instructions stored in the operating system memory 3470.

Figure 36:
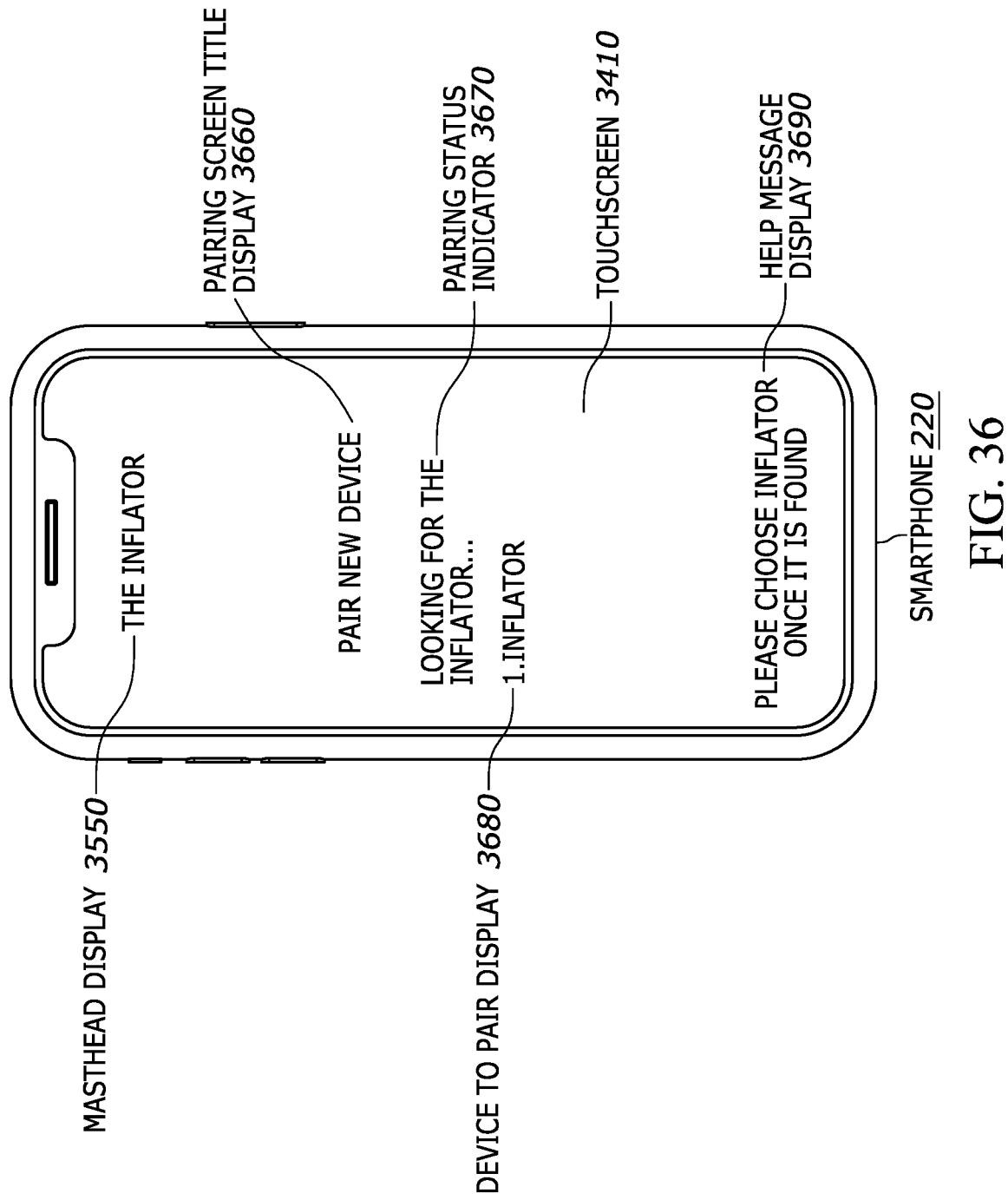
FIG. 36 illustrates a pairing screen view of the smartphone according to embodiments of the present inventions.

FIG. 36 illustrates a pairing screen view on the touchscreen 3410 of the smartphone 220 according to embodiments of the present inventions. The pairing screen view of FIG. 36 has a masthead display 3550. A pairing screen title display 3660 and a pairing status indicator 3670 and devices to pair displays 3680 are generated on the touchscreen 3410 by the operating system processor 3420 of the smartphone 220. A device to pair display 3680 are used by the user of this smartphone 2202 to observe and/or approve devices to be paired with the app on the smartphone 220. These paired devices, for example, are the four inflator boxes associated with the four tires of a vehicle. These paired devices can also be the central OBD module of the vehicle. A help message display 3690 is generated on the touchscreen 3410 by the operating system processor 3420 of the smartphone 220. These displays are generated by the operating system processor 3420 using instructions stored in the operating system memory 3470.

Figure 37:
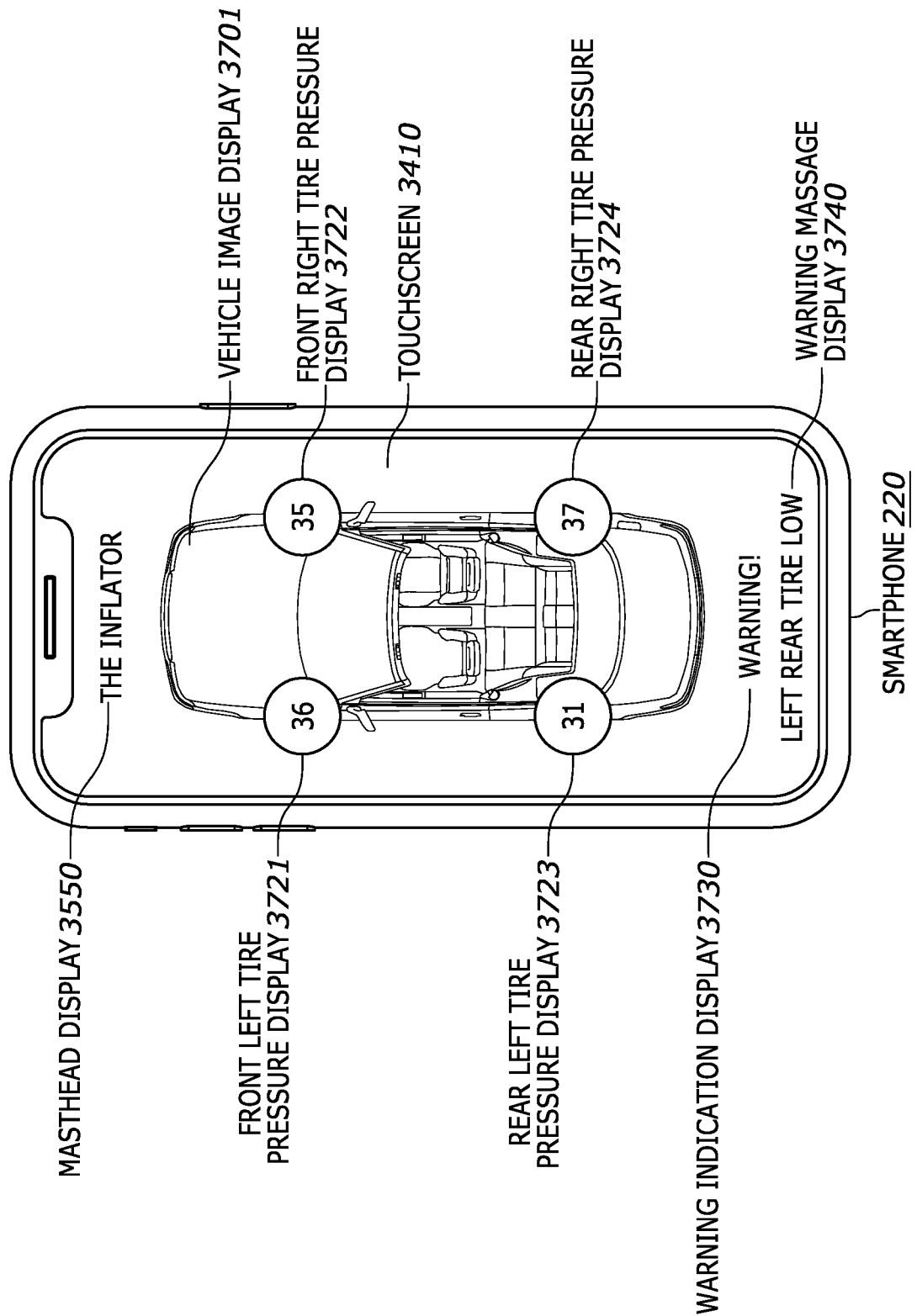
FIG. 37 illustrates a tire pressure and condition screen view of the smartphone according to embodiments of the present inventions.

FIG. 37 illustrates a tire pressure and condition screen view on the touchscreen 3410 of the smartphone 220 according to embodiments of the present inventions. The tire pressure conditions screen view of FIG. 37 has a masthead display 3550. A vehicle image display 3701 and four tire pressure displays—front left tire pressure display 3721, front right tire pressure display 3722, rear left tire pressure display 3723, and rear right tire pressure display 3724—are generated on the touchscreen 3410 by the operating system processor 3420 of the smartphone 220. These four tire pressure displays indicate the pressure of each of the four tires as received by the smartphone 220 over the cellular radio transceiver 3490 or the Bluetooth transceiver 3495 as stored in the tire parameters memory 3480 associated with the operating system processor 3420. A warning indicator display 3730 and a warning message display 3740 are generated on the touchscreen 3410 by the operating system processor 3420 of the smartphone 220. The warning indicator display 3730 and the warning message display 3740 indicate messages or alerts concerning tire status. For example, as illustrated in FIG. 37, the warning indicator display states quote morning estimation park unquote and the warning message display 3740 states quote left rear tire low unquote. An audible alarm or app alert may also be sounded depending on the severity of the messages in the warning indication.

The inflator box offers compatibility with our innovative and intuitive mobile application; this inflator app is available on app stores such as the Apple app store and Android Google Play store. The inflator app will allow the user an array of functions to monitor their vehicle tire status while also being proactive and reacting to any situations or catastrophes that may occur to the customer vehicle tire. The customer will first download, the inflator app, from the Apple app Store or Android Google Play Stores. Once the inflator app is downloaded, the customer will open up to an Opening Screen. The customer will then create new credentials and login information on the FIG. 35, Login Screen. The next screen FIG. 36, will pair their four inflator boxes with the central OBD module of their vehicle. Once connected, the next screen FIG. 36, is the Home Screen. The FIG. 35, the Home Screen will display a picture of their vehicle and show all four of their tires in a color-coded manor. FIG. 36, the Home Screen will show each individual tire pressure and show either 3 colors; green for within range, yellow for below pressure and red for catastrophic failure. The inflator app will increase the safety of the customer and be a preventative maintenance for slow leaking tires or catastrophic blowouts. In case of a catastrophic blowout, our customer service team will be reaching out and contacting the customer, warning them that their tire has experienced a catastrophic blowout and to ask if they need assistance. The inflator app will also be productive with slow leaking tires as well. If the tire experiences pressure to be below 3 PSI within a consecutive 48 hour period, it will trigger our system of a slow leak in the customer tire. Our customer service team will also be proactive and reach out to the customer letting them know which tire on their vehicle has a slow leak and to drive to their nearest repair facility. For customers that have more than one vehicle with the inflator box, the inflator app has the ability to connect multiple vehicles to their account and view multiple statuses of their vehicles.

FIG. 34 displays how a smartphone connects with the function of the central OBD module. When plugging in of the central OBD module to the OBD port within each vehicle, the central OBD module supplies the information between the inflator box and the customer. The central OBD module's microcontroller, the information is then distributed wirelessly to and from each inflator box's Short-Range Radio Transceiver. The vehicle OBD port supplies power to the central OBD module microcontroller. The OBD port within each vehicle is the port where a mechanic is able to plug their diagnostic tool into the vehicle, to diagnose if there are any problems with the vehicle. For example, if the check engine light appears on in a vehicle, the mechanic is able to plug their computer on to the OBD port and find out exactly what is wrong with the vehicle. This port is the access point to all of the information within the vehicle. The central OBD module will also provide important data to the inflator app. The central OBD module will be capable of providing information, for example the check-engine light appearing. It will diagnose the issue and display it on the smartphone touchscreen for the customer to see. The central OBD module information is important for driver safety and can provide vehicle health reports to the customer in real time. The overall purpose of the inflator app is not only to promote vehicle safety and driver awareness, but will provide the customer with a family safe and worry-free experience.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure. For example, although automotive vehicle examples are disclosed, the inventions are applicable to other vehicles with air filled tires such as motorcycles, trucks, military vehicles, aircraft, toys, and all terrain and hobby vehicles.

What is claimed is:

1. An apparatus for inflating a tubeless tire, comprising:
   a rechargeable electric storage for providing electrical power;
   an air compressor comprising a piston;
   an electric motor mechanically coupled to the air compressor to provide operational force on the piston of the air compressor, the electric motor electrically coupled to the rechargeable electric storage to provide the electrical power to operate the electric motor;
   an air pressure sensor for sensing a measured air pressure;
   an accelerometer; and
   a controller operatively coupled to the accelerometer and operatively coupled between the rechargeable electric storage and the electric motor to send the electrical power from the rechargeable electric storage to the electric motor and power the electric motor when both the accelerometer indicates no motion of the tubeless tire and the air pressure sensor indicates the measured air pressure is below a pressure threshold, wherein the controller comprises a memory and a timer for storing acceleration measurements and learning when the tubeless tire is apt to remain stationary, and wherein the controller refrains from operation of the electric motor when the tubeless tire is predicted apt to remain stationary.

2. The apparatus according to claim 1,
   wherein the air compressor has a compressed air inlet vented to atmosphere via an atmospheric opening through a rim of the tubeless tire and has a compressed air outlet feeding inside a pressure cavity of the tubeless tire; and
   wherein the electric motor and the air compressor are mounted on an outer circumference of an inside surface on the rim of the tubeless tire within the pressure cavity of the tubeless tire.

3. The apparatus according to claim 1, further comprising a motion activated power generator operatively coupled to the rechargeable electric storage for generating electrical power and recharging the rechargeable electric storage when the apparatus moves.

4. The apparatus according to claim 3, wherein the motion activated power generator comprises a kinetic weight to generate the electrical power when the apparatus moves.

5. The apparatus according to claim 3, wherein the motion activated power generator comprises a piezoelectric element to generate the electrical power as the apparatus moves.

6. The apparatus according to claim 3, wherein the motion activated power generator comprises a wire coil sufficient to generate the electrical power when the tubeless tire spins using magnetic field of earth.

7. The apparatus according to claim 1, wherein the controller operates the air compressor regardless if the tubeless tire is predicted apt to remain stationary if the measured air pressure is below another pressure threshold, the another pressure threshold being larger than the pressure threshold.

8. The apparatus according to claim 1,
   wherein the apparatus further comprises a short-range radio and an associated antenna operatively coupled to the controller and the rechargeable electric storage; and
   wherein the controller transmits the measured pressure data over the short-range radio.

9. The apparatus according to claim 8,
   wherein the apparatus further comprises a temperature sensor operatively coupled to the controller for measuring temperature data; and
   wherein the controller transmits the temperature data and an associated tubeless tire identifier over the short-range radio.

10. The apparatus according to claim 8,
    wherein the controller measures a rechargeable electric storage power level and transmits the rechargeable electric storage power level over the short-range radio; and
    wherein the controller keeps in memory a log of operation of the electric motor and transmits the log of the air compressor operation over the short-range radio.

11. The apparatus according to claim 8, wherein the short-range radio is chosen from the group consisting of Bluetooth, Bluetooth BLE, and WiFi.

12. The apparatus according to claim 1, further comprising an atmospheric long hose connecting the air compressor to atmosphere through a valve stem in a valve stem hole in a rim of the tubeless tire.

13. The apparatus according to claim 12, further comprising an inline air filter in series with the atmospheric long hose.

14. The apparatus according to claim 1, wherein the apparatus is disposed within a pressure cavity of the tubeless tire for inflating the tubeless tire.

15. The apparatus according to claim 1, further comprising a box for housing within the box at least the rechargeable electric storage, the electric motor, the air compressor, the accelerometer and the controller and wherein the box is disposed within a pressure cavity of the tubeless tire for inflating the tubeless tire.

16. The apparatus according to claim 15,
    wherein the box is mounted on an outer circumference of an inside surface on a rim of the tubeless tire within the pressure cavity of the tubeless tire; and
    wherein the apparatus further comprises at least one counterweight mounted on the outer circumference of the inside surface on the rim of the tubeless tire of a weight and a location in balance with the box.

17. An apparatus for inflating a tire, comprising:
    a rechargeable electric storage for providing electrical power;
    an air compressor comprising a piston;
    an DC motor mechanically coupled to the air compressor to provide operational force on the piston of the air compressor, the DC motor electrically coupled to the rechargeable electric storage to provide the electrical power to operate the DC motor;

an air pressure sensor for sensing a measured air pressure; and a controller operatively coupled between the rechargeable electric storage and the DC motor to send the electrical power from the rechargeable electric storage to the DC motor and power the DC motor when the air pressure sensor indicates the measured air pressure is below a pressure threshold and wherein the controller reverses a polarity of the electrical power to the DC motor from the rechargeable electric storage to the DC motor to operate the air compressor in a reverse direction when the air pressure sensor indicates the measured air pressure is above a pressure threshold, thereby deflating the tire.

18. The apparatus according to claim 17, wherein the air compressor has a compressed air inlet vented to atmosphere via an atmospheric opening through a rim of the tire and has a compressed air outlet feeding inside a pressure cavity of the tire; and wherein the DC motor and the air compressor are mounted on an outer circumference of an inside surface on the rim of the tire within the pressure cavity of the tire.

19. The apparatus according to claim 17, wherein the DC motor has an operating voltage matched to a voltage of the rechargeable electric storage; and wherein the rechargeable electric storage comprises one or more of a supercapacitor and a battery.

20. The apparatus according to claim 17, wherein the apparatus further comprises an accelerometer operatively coupled to the controller; and wherein the controller sends the electrical power from the rechargeable electric storage to the DC motor when both the accelerometer indicates no motion of the tire and the air pressure sensor indicates the measured air pressure is below a pressure threshold.

21. The apparatus according to claim 17, further comprising a motion activated power generator operatively coupled to the rechargeable electric storage for generating electrical power and recharging the rechargeable electric storage when the apparatus moves.

22. The apparatus according to claim 21, wherein the motion activated power generator comprises a kinetic weight to generate the electrical power when the apparatus moves.

23. The apparatus according to claim 21, wherein the motion activated power generator comprises a piezoelectric element to generate the electrical power as the apparatus moves.

24. The apparatus according to claim 21, wherein the motion activated power generator comprises a wire coil sufficient to generate the electrical power when the tire spins using magnetic field of earth.

25. The apparatus according to claim 17, further comprising an atmospheric long hose connecting the air compressor to atmosphere through a valve stem in a valve stem hole in a rim of the tire.

26. The apparatus according to claim 25, further comprising an inline air filter in series with the atmospheric long hose.

27. The apparatus according to claim 17, wherein the apparatus is disposed within a pressure cavity of the tire for inflating the tire.

28. The apparatus according to claim 17, further comprising a box for housing within the box at least the rechargeable electric storage, the DC motor, the air compressor, the air pressure sensor and the controller and wherein the box is disposed within a pressure cavity of the tire for inflating the tire.

29. The apparatus according to claim 28, wherein the box is mounted on an outer circumference of an inside surface on the rim of the tire within the pressure cavity of the tire; and wherein at least one counterweight mounted on the outer circumference of the inside surface on the rim of the tire of a weight and a location in balance with the box.

30. The apparatus according to claim 17, wherein the apparatus further comprises a short-range radio and an associated antenna operatively coupled to the controller and the rechargeable electric storage; and wherein the controller transmits the measured pressure data over the short-range radio.

31. The apparatus according to claim 30, wherein the apparatus further comprises a temperature sensor operatively coupled to the controller for measuring temperature data; and wherein the controller transmits the temperature data and an associated tire identifier over the short-range radio.

32. An apparatus for inflating a tire, comprising:

a rechargeable electric storage for providing electrical power;

an air compressor comprising a piston;

an electric motor mechanically coupled to the air compressor to provide operational force on the piston of the air compressor, the electric motor electrically coupled to the rechargeable electric storage to provide the electrical power to operate the electric motor;

an air valve operatively connected between the air compressor and an atmospheric opening in the tire;

an air pressure sensor for sensing a measured air pressure; and a controller operatively coupled to the pressure sensor and operatively coupled between the rechargeable electric storage and the electric motor to send the electrical power from the rechargeable electric storage to the electric motor and power the electric motor when the air pressure sensor indicates the measured air pressure is below a pressure threshold and wherein the controller activates the air valve to reverse air flow from the air compressor when the air pressure sensor indicates the measured air pressure is above a pressure threshold, thereby deflating the tire.

33. The apparatus according to claim 32, further comprising:

a plurality of wheels, each of the wheels comprising an associated tire and an associated controller operatively coupled to an associated wireless radio and antenna; and a central module comprising a central wireless radio wirelessly coupled to the wireless radio and antenna associated with each of the plurality of wheels.

34. The apparatus according to claim 32, wherein the apparatus further comprises an accelerometer operatively coupled to the controller; and wherein the controller sends the electrical power from the rechargeable electric storage to the electric motor when both the accelerometer indicates no motion of the tire and the air pressure sensor indicates the measured air pressure is below a pressure threshold.

35. The apparatus according to claim 32,
wherein the electric motor comprises a DC motor having an operating voltage matched to a voltage of the rechargeable electric storage and operatively coupled to the rechargeable electric storage; and
wherein the rechargeable electric storage comprises one or more of a supercapacitor and a battery.

36. The apparatus according to claim 32, further comprising a motion activated power generator operatively coupled to the rechargeable electric storage for generating electrical power and recharging the rechargeable electric storage when the apparatus moves.

37. The apparatus according to claim 36, wherein the motion activated power generator comprises a kinetic weight to generate the electrical power when the apparatus moves.

38. The apparatus according to claim 36, wherein the motion activated power generator comprises a piezoelectric element to generate the electrical power as the apparatus moves.

39. The apparatus according to claim 36, wherein the motion activated power generator comprises a wire coil sufficient to generate the electrical power when the tire spins using magnetic field of earth.

40. The apparatus according to claim 32,
wherein the air compressor has a compressed air inlet vented to atmosphere via an atmospheric opening through a rim of the tire and has a compressed air outlet feeding inside a pressure cavity of the associated tire; and
wherein the electric motor and the air compressor are mounted on an outer circumference of an inside surface on the rim of the tire within the pressure cavity of the tire.

41. The apparatus according to claim 32, further comprising an atmospheric long hose connecting the air compressor to atmosphere through a valve stem in a valve stem hole in a rim of the tire.

42. The apparatus according to claim 41, further comprising an inline air filter in series with the atmospheric long hose.

43. The apparatus according to claim 32, wherein the apparatus is disposed within a pressure cavity of the tire for inflating the tire.

44. The apparatus according to claim 32, further comprising a box for housing within the box at least the rechargeable electric storage, the electric motor, the air compressor, the air pressure sensor and the controller and wherein the box is disposed within a pressure cavity of the tire for inflating the tire.

45. The apparatus according to claim 44,
wherein the box is mounted on an outer circumference of an inside surface on a rim of the tire within the pressure cavity of the tire; and
wherein at least one counterweight is mounted on the outer circumference of the inside surface on the rim of the tire of a weight and a location in balance with the box.

46. The apparatus according to claim 32,
wherein the apparatus further comprises a short-range radio and an associated antenna operatively coupled to the controller and the rechargeable electric storage; and
wherein the controller transmits the measured air pressure over the short-range radio.

47. The apparatus according to claim 46,
wherein the apparatus further comprises a temperature sensor operatively coupled to the controller for measuring temperature data; and
wherein the controller transmits the temperature data and an associated tire identifier over the short-range radio.

48. An apparatus for inflating a tubeless tire, comprising:
a rechargeable electric storage for providing electrical power;
an air compressor comprising a piston;
an electric motor mechanically coupled to the air compressor to provide operational force on the piston of the air compressor, the electric motor electrically coupled to the rechargeable electric storage to provide the electrical power to operate the electric motor;
an air pressure sensor for sensing a measured air pressure; and
a controller operatively coupled between the rechargeable electric storage and the electric motor to send the electrical power from the rechargeable electric storage to the electric motor and power the electric motor when the air pressure sensor indicates the measured air pressure is below a pressure threshold;
wherein the apparatus further comprises a box for housing within the box at least the rechargeable electric storage, the electric motor, the air compressor, the air pressure sensor and the controller and wherein the box is disposed within a pressure cavity of the tubeless tire for inflating the tubeless tire, wherein the box is mounted using a shrink wrap on an outer circumference of an inside surface on a rim of the tubeless tire within the pressure cavity of the tubeless tire; and
at least one counterweight mounted on the outer circumference of the inside surface on the rim of the tubeless tire of a weight and a location in balance with the box.

49. The apparatus according to claim 48, wherein the box is also glued on the inside surface of the rim of the tubeless tire within the pressure cavity of the tubeless tire.

50. The apparatus according to claim 48, wherein a friction pad is inserted between the box and the inside surface of the rim of the tubeless tire within the pressure cavity of the tubeless tire.

51. A tire inflation system for an associated vehicle, comprising:
a plurality of wheels, each wheel comprising a rim and a tubeless tire mounted on an outer circumference of the rim to form a pressure cavity between the tubeless tire and the rim; wherein each of the plurality of wheels further comprises:
an air compressor comprising a piston, the air compressor mounted at the outer circumference of the rim inside the tubeless tire between the tubeless tire and the outer circumference of the rim to pump air with the piston into the pressure cavity between the tubeless tire and the rim;
an electric motor mechanically coupled to the air compressor to provide operational force on the piston of the air compressor, the electric motor also mounted at the outer circumference of the rim inside the tubeless tire between the tubeless tire and the outer circumference of the rim;
an electrical storage mounted at the outer circumference of the rim inside the tubeless tire between the tubeless tire and the outer circumference of the rim and electrically coupled to the electric motor to provide electrical power to operate the electric motor;

a vent through the rim operatively coupled to communicate atmospheric air with the air compressor between atmospheric pressure outside of the wheel and the pressure cavity between the tubeless tire and the rim;

an air pressure sensor mounted to the rim to sense inside the pressure cavity;

a wireless radio and antenna; and a tire controller mounted at the outer circumference of the rim inside the pressure cavity of the tubeless tire and operatively coupled to the electrical storage and the air pressure sensor and the electric motor to control delivery of the electrical power from the electrical storage to the electric motor and operate the air compressor; and a central module comprising a central wireless radio wirelessly coupled to the wireless radio and antenna associated with each of the plurality of wheels, wherein the central module comprises a central controller for receiving via the wireless radio and antenna of each tire controller associated with each of the plurality of wheels acceleration data and a tire ID and storing in memory to compare with past acceleration data of each tire ID and self-learn a determination of where tires have moved to a new location on the associated vehicle.

52. The tire inflation system according to claim 51, wherein the central module comprises an OBD port interface to plug into the associated vehicle and obtain power from the associated vehicle.

53. The tire inflation system according to claim 51,
wherein each of the plurality of wheels further comprises an accelerometer operatively coupled to an associated tire controller; and
wherein each associated tire controller sends electrical power from an associated electrical storage to an associated electric motor when both the associated accelerometer indicates no motion of an associated one of the plurality of wheels and an associated air pressure sensor indicates an associated measured air pressure is below a pressure threshold.

54. The tire inflation system according to claim 51,
wherein each electric motor comprises a DC motor having an operating voltage matched to a voltage of an associated electrical storage and operatively coupled to the associated electrical storage; and
wherein each electrical storage comprises one or more of a supercapacitor and battery.

55. The tire inflation system according to claim 51, wherein each of the plurality of wheels further comprises a motion activated power generator operatively coupled to an associated electrical storage for generating electrical power and recharging the associated electrical storage when an associated wheel moves.

56. The tire inflation system according to claim 55, wherein each motion activated power generator comprises a kinetic weight to generate the electrical power when the associated wheel moves.

57. The tire inflation system according to claim 55, wherein each motion activated power generator comprises a piezoelectric element to generate the electrical power as the associated wheel moves.

58. The tire inflation system according to claim 55, wherein each motion activated power generator comprises a wire coil sufficient to generate the electrical power when the associated wheel spins using magnetic field of earth.

59. The tire inflation system according to claim 51,
wherein each air compressor has a compressed air inlet vented to atmosphere via an associated vent through an associated rim of an associated wheel and has a compressed air outlet feeding inside an associated pressure cavity of the associated wheel; and
wherein each electric motor and associated air compressor are mounted on an associated outer circumference of an associated inside surface on an associated rim of the associated wheel within an associated pressure cavity.

60. The tire inflation system according to claim 51, wherein each of the plurality of wheels further comprises an atmospheric long hose connecting an associated air compressor to atmosphere through a valve stem in an associated vent in a rim of the tubeless tire.

61. The tire inflation system according to claim 60, wherein each of the plurality of wheels further comprises an inline air filter in series with an associated atmospheric long hose.

62. The tire inflation system according to claim 51, wherein at least the air compressor, the electric motor, the electrical storage, the air pressure sensor, the wireless radio, and the tire controller of each wheel are disposed within the pressure cavity of an associated wheel for inflating an associated tubeless tire.

63. The tire inflation system according to claim 51, wherein each of the plurality of wheels comprises a box for housing within the box at least the electrical storage, the electric motor, the air compressor, the air pressure sensor and the tire controller and wherein the box is disposed within an associated pressure cavity of an associated wheel for inflating an associated tubeless tire.

64. The tire inflation system according to claim 63,
wherein the box is mounted on an outer circumference of an inside surface on the rim of the tubeless tire within the pressure cavity of the tubeless tire; and
wherein at least one counterweight mounted on the outer circumference of the inside surface on the rim of the tubeless tire of a weight and a location in balance with the box.

* * * * *